US 6,562,077 B2

(12) United States Patent
Bobrow et al.

(10) Patent No.: US 6,562,077 B2
(45) Date of Patent: *May 13, 2003

(54) SORTING IMAGE SEGMENTS INTO CLUSTERS BASED ON A DISTANCE MEASUREMENT

(75) Inventors: Daniel G. Bobrow, Palo Alto, CA (US); James V. Mahoney, Los Angeles, CA (US); William J. Rucklidge, Mountain View, CA (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 74 days.

(21) Appl. No.: 08/970,507

(22) Filed: Nov. 14, 1997

(65) Prior Publication Data

US 2002/0029232 A1 Mar. 7, 2002

(51) Int. Cl.[7] .................................................. G06F 7/00
(52) U.S. Cl. ...................... 715/517; 715/500; 715/530; 382/306
(58) Field of Search ................................. 382/225, 306; 707/530, 517, 501, 500

(56) References Cited

U.S. PATENT DOCUMENTS

| 4,574,395 A | 3/1986 | Kato ........................... 382/61 |
| 4,632,252 A | 12/1986 | Haruki et al. ................ 209/546 |
| 4,783,825 A | 11/1988 | Hirose et al. ................... 382/1 |
| 4,845,761 A | 7/1989 | Cate et al. ....................... 382/1 |

(List continued on next page.)

FOREIGN PATENT DOCUMENTS

| EP | 0 544 431 A2 | 6/1993 |
| EP | 0 544 432 A2 | 6/1993 |
| EP | 0 889 417 A2 | 1/1999 |
| JP | 59103460 | 6/1984 |

OTHER PUBLICATIONS

The Recognition of Form Documents Based on Three Types of Line Segments, Tseng et al, IEEE, 1997, p. 71–75.*
Ashley, Jonathan Et Al. "Automatic and Semi–Automatic Methods for Image Annotation and Retrieval in QBIC," Storage and Retrieval for Image and Video Databases III, *Proceedings SPIE vol. 2420*, San Jose, California; Feb. 9–10, 1995, pp. 24–35.

(List continued on next page.)

*Primary Examiner*—Stephen S. Hong
*Assistant Examiner*—Cesar B. Paula

(57) ABSTRACT

A programming interface of document search system enables a user to dynamically specifying features of documents recorded in a corpus of documents. The programming interface provides category and format flexibility for defining different genre of documents. The document search system initially segments document images into one or more layout objects. Each layout object identifies a structural element in a document such as text blocks, graphics, or halftones. Subsequently, the document search system computes a set of attributes for each of the identified layout objects. The set of attributes are used to describe the layout structure of a page image of a document in terms of the spatial relations that layout objects have to frames of reference that are defined by other layout objects. Using the set of attributes a user defines features of a document with the programming interface. After receiving a feature or attribute and a set of document images selected by a user, the system forms a set of image segments by identifying those layout objects in the set of document images that make up the selected feature or attribute. The system then sorts the set of image segments into meaningful groupings of objects which have similarities and/or recurring patterns. Subsequently, document images in the set of document images are ordered and displayed to a user in accordance with the meaningful groupings.

23 Claims, 21 Drawing Sheets

U.S. PATENT DOCUMENTS

| | | | |
|---|---|---|---|
| 4,908,873 A | 3/1990 | Philibert et al. | 382/34 |
| 4,912,771 A | 3/1990 | Komine et al. | 382/46 |
| 5,060,980 A | 10/1991 | Johnson et al. | 283/70 |
| 5,084,769 A | 1/1992 | Miura | 358/403 |
| 5,228,100 A | 7/1993 | Takeda et al. | 382/61 |
| 5,265,242 A | 11/1993 | Fujisawa et al. | 395/600 |
| 5,267,303 A | 11/1993 | Johnson et al. | 379/100 |
| 5,282,052 A | 1/1994 | Johnson et al. | 358/402 |
| 5,313,572 A | 5/1994 | Yamamoto et al. | 395/145 |
| 5,317,646 A | 5/1994 | Sang, Jr. et al. | 382/9 |
| 5,321,770 A | 6/1994 | Huttenlocher et al. | 382/174 |
| 5,325,444 A | 6/1994 | Cass et al. | 382/177 |
| 5,335,088 A | 8/1994 | Fan | 358/429 |
| 5,339,172 A | 8/1994 | Robinson | 358/462 |
| 5,363,214 A | 11/1994 | Johnson | 358/462 |
| 5,369,714 A | 11/1994 | Withgott et al. | 382/177 |
| 5,384,863 A | 1/1995 | Huttenlocher et al. | 382/173 |
| 5,390,259 A | 2/1995 | Withgott et al. | 382/173 |
| 5,434,933 A | 7/1995 | Karnin et al. | 382/317 |
| 5,434,953 A | 7/1995 | Bloomberg | 345/439 |
| 5,442,778 A | 8/1995 | Pedersen et al. | 707/5 |
| 5,448,375 A | 9/1995 | Cooper et al. | 358/403 |
| 5,455,898 A * | 10/1995 | Mahoney et al. | 345/433 |
| 5,491,760 A | 2/1996 | Withgott et al. | 382/317 |
| 5,524,066 A | 6/1996 | Kaplan et al. | 382/229 |
| 5,537,491 A | 7/1996 | Mahoney et al. | 382/218 |
| 5,539,841 A | 7/1996 | Huttenlocher et al. | 382/218 |
| 5,542,002 A | 7/1996 | Choate et al. | 382/112 |
| 5,598,507 A | 1/1997 | Kimber et al. | 704/246 |
| 5,625,770 A | 4/1997 | Nomura | 395/761 |
| 5,694,594 A * | 12/1997 | Chang | 707/6 |
| 5,708,825 A * | 1/1998 | Sotomayor | 707/501 |
| 5,724,579 A | 3/1998 | Suzuki | 395/615 |
| 5,745,610 A | 4/1998 | Johnson | 382/309 |
| 5,764,799 A * | 6/1998 | Hong et al. | 382/225 |
| 5,778,397 A | 7/1998 | Kupiec et al. | 707/500 |
| 5,818,965 A | 10/1998 | Davies | 382/225 |
| 5,835,638 A | 11/1998 | Rucklidge et al. | 382/257 |
| 5,850,490 A * | 12/1998 | Johnson | 382/306 |
| 5,857,199 A * | 1/1999 | Tamano et al. | 707/104 |
| 5,859,935 A | 1/1999 | Johnson et al. | 382/317 |
| 5,889,886 A | 3/1999 | Mahoney | 382/176 |
| 5,909,508 A * | 6/1999 | Wakatani et al. | 382/225 |
| 5,930,393 A * | 7/1999 | Ho et al. | 382/225 |
| 5,930,809 A * | 7/1999 | Middlebrook | 707/501 |
| 5,931,907 A * | 8/1999 | Davies et al. | 709/218 |
| 5,953,732 A * | 9/1999 | Meske, Jr. et al. | 707/513 |
| 5,966,455 A * | 10/1999 | Saito | 382/112 |
| 5,999,653 A | 12/1999 | Rucklidge et al. | 382/227 |
| 6,009,196 A | 12/1999 | Mahoney | 382/176 |
| 6,014,452 A * | 1/2000 | Zhang et al. | 382/132 |
| 6,038,340 A * | 3/2000 | Ancin et al. | 382/167 |
| 6,038,561 A * | 3/2000 | Snyder et al. | 707/6 |
| 6,052,481 A * | 4/2000 | Grajski et al. | 382/187 |
| 6,058,205 A * | 5/2000 | Bahl et al. | 382/159 |
| 6,108,446 A * | 8/2000 | Hoshen | 382/225 |
| 6,128,410 A * | 10/2000 | Park et al. | 382/218 |
| 6,137,911 A * | 10/2000 | Zhilyaev | 382/225 |
| 6,173,275 B1 * | 1/2001 | Caid et al. | 706/14 |
| 6,327,387 B1 * | 12/2001 | Naoi et al. | 382/173 |

OTHER PUBLICATIONS

Belongie, Serge Et Al. "Recognition of Images in Large Databases Using a Learning Framework," U.C. Berkeley C.S. Technical Report 97–939. Jun. 2, 1997.

Blomberg, Jeanette Et Al. "Reflections on a Work–Oriented Design Project," PDC '94: Proceedings of the Participatory Design Conference, Chapel Hill, North Carolinea; Oct. 27–28, 1994; pp. 99–109. Revised publication in Human–Computer Interaction in 1996, vol. 11, pp. 237–265.

Carson, Chad Et Al. "Region–Based Image Querying," IEEE Proceedings of CAIVL '97, Puerto Rico, Jun. 20, 1997.

Carson, Chad and Virginia E. Ogle. "Storage and Retrieval of Feature Data for a Very Large Online Image Collection," IEEE Computer Society Bulletin of the Technial Committee on Data Engineering, Dec. 1996, vol. 19, No. 4.

Fernandes, David Et Al. "Coding of Numerical Data in JBIG–2," published by ISO/IEC JTC 1/SC 29/WG 1 (ITU–T SG8) standards for Coding of Still Pictures (JBIG/JPEG), Aug. 18, 1997.

Haralick, Robert M. "Document Image Understanding: Geometric and Logical Layout," Proceedings of 1994 IEEE Computer Society Conference on Computer Vision and Pattern Recognition, Jun. 21–23, 1994; Seattle, Washington; pp. 385–390.

Imagio MF530 Model 3 sales brochure, Ricoh corporation, Jan. 1993.

Johnson, Walter Et Al. "Bridging the Paper and Electronic Worlds: The Paper User Interface," INTERCHI '93 Conference Proceedings (Amsterdam, The Netherlands, Apr. 24–29, 1993) ACM, New York, 1993, pp. 507–512.

Kise, Koichi Et Al. "Visting Card Understanding System," $9^{th}$ International Conference on Pattern Recognition, Rome, Italy; Nov. 14–17, 1988, vol. I, pp. 425–429.

Learning Lexis®, Mead Data Central, Inc. 1992, pp. 12, 13, and 19.

Niblack, W. Et Al. "The QBIC Project: Querying Images By Content Using Color, Texture, and Shape," SPIE vol. 1908 (1993) pp. 173–187.

Rao, Ramana Et Al. "Protofoil: Storing and Finding the Information Worker's Paper Documents in an Electronic File Cabinet," CHI '94 Conference Proceedings, Boston, Massachusetts; Apr. 24–28, 1994; pp. 180–185.

Rucklidge, William. Efficient Visual Recognition Using The Hausdorff Distance, Lecture Notes in Computer Science, vol. 1173, G. Goos et al. ed., Santa Clara, Springer, 1996.

Spitz, A Lawrence "Style Directed Document Recognition," Proceedings of the First International Conference on Document Analysis and Recognition, St. Malo, France, 1991, pp. 611–619.

Story, Guy A. Et Al. "The RightPapers Image–Based Electronic Library for Alerting and Browsing," Computer, vol. 25, No. 9, Sep. 1992, pp. 17–25.

Syeda–Mahmood, Tanveer. "Indexing of Handwritten Document Images," Proceedings of IEEE Document Image Analysis Workshop, Puerto Rico, Jun. 20, 1997.

TextBridge Pro[98] User's Guide, by ScanSoft Inc., a Xerox Company, 1997. (available on the internet at: http://support.scansoft.com/tx/txdoc.asp) with specific reference to "Zoning the Page" on pp. 2–18 through 2–20.

Using PaperWorks™ from a Fax Machine, Xerox Corporation, 1992, pp. 20–23 and 36.

Using PaperWorks™ on a PC, Xerox Corporation, 1992, pp. 71–85.

Wayner, Peter "Optimal Character Recognition," Byte, Dec. 1993, pp. 203, 204, 206, 208 and 210.

Westlaw Reference Manual, Fourth Edition, West Publishing Company, San Francisco, 1990, pp. 47–49, 51–70, 99, 100, and 117–119.

Wiederhold, Gio. File Organization for Database Design, McGraw–Hill Book Company, New York, 1987, pp. 350–359.

* cited by examiner

SORTING IMAGE SEGMENTS INTO CLUSTERS BASED ON A DISTANCE MEASUREMENT

CROSS-REFERENCE TO RELATED APPLICATIONS

Cross-reference is made to U.S. patent application Ser. Nos. 08/971,022, entitled "System For Searching A Corpus Of Document Images By User Specified Document Layout Components" (now U.S. Pat. No. 5,999,664), 08/971,210, entitled "System For Summarizing A Corpus Of Documents By Assembling User Specified Layout Components", and 08/971,020, entitled "System For Progressively Transmitting And Displaying Layout Components Of Document Images", which are assigned to the same assignee as the present invention.

BACKGROUND OF THE INVENTION

1. Field of the Invention

The present invention relates generally to a system for managing and searching a large corpus of documents, and more particularly, to a system for sorting sets of documents with user-specified layout components of the documents recorded in the large corpus of documents.

2. Description of Related Art

Searching for a document in a large heterogeneous corpus of documents stored in an electronic database is often difficult because of the sheer size of the corpus (e.g., 750,000 documents). Many of the documents that make up the corpus are documents that cannot be identified by simply performing text based searches. In some instances, some documents in the corpus may, for example, be scanned images of hardcopy documents, or images derived using PDF (Portable Documents Formats), or PostScript®. In other instances, simply searching the text of documents may not narrow a search sufficiently to locate a particular document in the corpus.

Techniques for searching the text of a document in a large corpus of documents exist. U.S. Pat. No. 5,442,778 discloses a scatter-gather browsing method which is a cluster-based method for browsing a large corpus of documents. This system addresses the extreme case in which there is no specific query, but rather a need to get an idea of what exists in a large corpus of documents. Scatter-gather relies on document clustering to present to a user descriptions of large document groups. Document clustering is based on the general assumption that mutually similar documents tend to be relevant to the same queries. Based on the descriptions of the documents groups, the user selects one or more of the document groups for further study. These selected groups are gathered together to form a sub-collection. This process repeats and bottoms out when individual documents are viewed.

Also, techniques exist that analyze the machine readable text of a document for identifying the genre of documents. The genre of text relates to a type of text or type of document. An example of a method for identifying the genre of machine readable text is disclosed in European Patent Application EP889417A2, entitled "Text Genre Identification". Initially, machine readable text is analyzed to formulate a cue vector. The cue vector represents occurrences in the text of a set of non-structural, surface cues, which are easily computable. A genre of the text is then determined by weighing the elements making up the cue vector.

Besides text found in a document, often the layout of a particular document contains a significant amount of information that can be used to identify a document stored in a large corpus of documents. Using the layout structure of documents to search a large corpus of documents is particularly advantageous when documents in the corpus have not been tagged with a high level definition. Hardcopy documents which are scanned are recorded as bitmap images that have no structural definition that is immediately perceivable by a computer. A bitmap image generally consists of a sequence of image data or pixels. To become searchable, the structure of a bitmap image is analyzed to identify its layout structure.

By examining different work practices, it has been found that a work process (i.e., manner of working) can be supported with a system that is capable of searching and retrieving documents in a corpus by their type or genre (i.e., functional category). Where some genres of documents are general in the sense that they recur across different organizations and work processes, other genre of documents are idiosyncratic to a particular organization, task, or even user. For example, a business letter and a memo are examples of a general genre. A set of documents with an individual's private stamp in the upper right corner of each document is an example of a genre that is idiosyncratic to a particular user. It has also been found that many different genre of documents have a predefined form or a standard set of components that depict a unique spatial arrangement. For example, business letters are divided into a main body, author and recipient addresses, and signature. Unlike specific text based identifiers, which are used to identify the genre of a document, the layout structure of documents can apply across different classes of documents.

A number of different techniques have been developed for analyzing the layout structure of a bitmap image. Generally, page layout analysis has been divided into two broad categories: geometric layout analysis and logical structure analysis. Geometric layout analysis extracts whatever structure can be inferred without reference to models of particular kinds of pages—e.g., letter, memo, title page, table, etc. Logical structure analysis classifies a given page within a repertoire of known layouts, and assigns functional interpretations to components of the page based on this classification. Geometric analysis is generally preliminary to logical structure analysis. (For further background on image layout analysis see U.S. Pat. No. 6,009,196, entitled "Method For Classifying Non-Running Text In An Image" and its references).

The present invention concerns a method and apparatus for defining user-specified layout structures of documents (i.e., the visual appearance) to facilitate the search and retrieval of a document stored in a multi-genre database of documents. This method of searching documents focuses a search according to the manner in which the layout structure of a document is defined. Unlike many techniques for searching the text within a document, searching documents according to their layout structure is based on the appearance and not the textual content found in a document. The general premise for searching documents based on their layout structure is that the layout structure of text documents often reflect its genre. For example, business letters are in many ways more visually similar to one another than they are to magazine articles. Thus, a user searching for a particular document while knowing the class of documents is able to more effectively narrow the group of documents being searched.

One problem addressed by this invention is how to best manage a large corpus of scanned documents. Many document search and retrieval systems rely entirely on the results of applying OCR (Optical Character Recognition) to every scanned document image. Generally, OCR techniques involve segmenting an image into individual characters which are then decoded and matched to characters in a library. Typically, such OCR techniques require extensive computational effort, generally have a non-trivial degree of recognition error, and often require significant amounts of time for image processing. In operation, OCR techniques distinguish each bitmap of a character from its neighbor, analyze its appearance, and distinguish it from other characters in a predetermined set of characters.

A disadvantage of OCR techniques is that they are often an insufficient means for capturing information in scanned documents because the quality of OCR results may be unacceptably poor. For example, the OCR results for a scanned document may be poor in quality because the original document was a heavily used original, a facsimile of an original, or a copy of an original. In each of these examples, the scanned results of an original document may provide insufficient information for an OCR program to accurately identify the text within the scanned image. In some instances, some scanned documents may be handwritten in whole or in part, thereby making those portions of the original document unintelligible to an OCR program.

Another disadvantage of OCR techniques is that the layout or formatting of the document is typically not preserved by an OCR program. As recognized by Blomberg et al. in "Reflections on a Work-Oriented Design Project" (published in PDC'94: Proceedings of the Participatory Design Conference, p. 99–109, on Oct. 27–28, 1994), users searching for a particular document in a large corpus of documents tend to rely on clues about the form and structure of the documents. Such clues, which could be gained from either the original bitmap image or reduced scale images (i.e., thumbnails), tend to be lost in ASCII text renderings of images. Thus, the layout or formatting of a document, which is usually not captured or preserved when a scanned image is reduced to text using an OCR program, is crucial information that can be used for identifying that document in a large corpus of documents. Improved OCR programs such as TextBridge®, which is produced by Xerox ScanSoft, Inc., are capable of converting scanned images into formatted documents (e.g. HTML (hypertext markup language)) with tables and pictures as opposed to a simple ASCII text document (more information can be found on the Internet at http://www.xerox.com/xis/textbridge/).

An alternative technique for identifying information contained in electronic documents without having to decode a document using OCR techniques is disclosed in U.S. Pat. No. 5,491,760 and its references. This alternative technique segments an undecoded document image into word image units without decoding the document image or referencing decoded image data. Once segmented, word image units are evaluated in accordance with morphological image properties of the word image units, such as word shape. (These morphological image properties do not take into account the structure of a document. That is, the word image units do not take into account where the shape appeared in a document.) Those word image units which are identified as semantically significant are used to create an ancillary document image of content which is reflective of the subject matter in the original document. Besides image summarization, segmenting a document into word image units has many other applications which are disclosed in related U.S. Pat. Nos. 5,539,841; 5,321,770; 5,325,444; 5,390,259; 5,384,863; and 5,369,714. For instance, U.S. Pat. No. 5,539,841 discloses a method for identifying when similar tokens (e.g., character, symbol, glyph, string of components) are present in an image section; U.S. Pat. No. 5,324,444 discloses a method for determining the frequency of words in a document, and U.S. Pat. No. 5,369,714 discloses a method for determining the frequency of phrases found in a document.

Another alternative to performing OCR analysis on bitmap images are systems that perform content-based searches on bitmap images. An example of such a system is IBM's Query by Image Content (QBIC) system. The QBIC system is disclosed in articles by Niblack et al., entitled "The QBIC project: querying images by content using color, texture and shape," in SPIE Proc. Storage and Retrieval for Image and Video Databases, 1993, and by Ashley et al., entitled "Automatic and semiautomatic methods for image annotation and retrieval in QBIC," in SPIE Proc. Storage and Retrieval for Image and Video Databases, pages 24–35, 1995. A demo of a QBIC search engine is available on the internet at "http://wwwqbic.almaden.ibm.com/-qbic/qbic.html". Using the QBIC™ system, bitmap images in a large database of images can be queried by image properties such as color percentages, color layouts, and textures. The image-based queries offered by the QBIC system are combined with text or keyword for more focused searching.

Another system for performing content-based queries is being developed as part of the UC Berkeley Digital Library Project. Unlike the QBIC system which relies on low-level image properties to perform searches, the Berkeley system groups properties and relationships of low level regions to define high-level objects. The premise of the Berkeley system is that high-level objects can be defined by meaningful arrangements of color and texture. Aspects of the Berkeley system are disclosed in the following articles and their references: Chad Carson et al., "Region-Based Image Querying," CVPR '97 Workshop on Content-Based Access of Image and Video Libraries; Serge Belongie et al., "Recognition of Images in Large Databases Using a Learning Framework," UC Berkeley CS Tech Report 97-939; and Chad Carson et al., "Storage and Retrieval of Feature Data for a Very Large Online Image Collection," IEEE Computer Society Bulletin of the Technical Committee on Data Engineering, Dec. 1996, Vol. 19 No. 4.

In addition to using OCR programs or the like to decipher the content of scanned documents, it is also common to record document metadata (i.e., document information) at the time a hardcopy document is scanned. This document metadata, which is searchable as text, may include the subject of the document, the author of the document, keywords found in the document, the title of the document, and the genre or type of document. A disadvantage of using document metadata to identify documents is that the genre specified for a particular corpus of documents is not static. Instead, the number of different genre of documents in a corpus can vary as the corpus grows. A further disadvantage of document metadata is that it is time consuming for a user to input into a system. As a result, a system for managing and searching scanned documents should be robust enough to provide a mechanism for defining categories and subcategories of document formats as new documents are added to the corpus.

Another method for locating documents in a large corpus of documents is by searching and reviewing human-supplied summaries. In the absence of human-supplied summaries, systems can be used that automatically generate documents summaries. One advantage for using summaries in document search and retrieval systems is that they reduce the amount of visual information that a user must examine in the course of searching for a particular document. By being presented on a display or the like with summaries of documents instead of the entire document, a user is better able to evaluate a larger number of documents in a given amount of time.

Most systems that automatically summarize the contents of documents create summaries by analyzing the ASCII text that makes up the documents. One approach locates a subset of sentences that are indicative of document content. For example, U.S. Pat. No. 5,778,397, assigned to the same assignee as the present invention, discloses a method for generating feature probabilities that allow later generation of document extracts. Alternatively, U.S. Pat. No. 5,491,760 discloses a method for summarizing a document without decoding the textual contents of a bitmap image. The summarization technique disclosed in the '760 Patent uses automatic or interactive morphological image recognition techniques to produce documents summaries.

Accordingly, it would be desirable to provide a system for managing and searching a large corpus of scanned documents in which not only are text identified using an OCR program and inputted document metadata searchable but also the visual representations of scanned documents can be identified. Such a system would advantageously search, summarize, sort, and transmit documents using information that defines the structure and format of a document. It would also be desirable in such a system to provide an interface for a user to flexibly specify the genre of document by the particular layout format of documents. One reason this is desirable is that genre of documents tend to change and emerge over the course of using and adding document to a corpus. Consequently, an ideal system would give users the flexibility to specify either a new genre or a specific class of genre that is of interest to a single user or group of users.

SUMMARY OF THE INVENTION

In accordance with the invention there is provided a system, and method and article of manufacture therefor, for sorting document images stored in a memory. The document images are sorted by segmenting each document image recorded in the memory into a set of layout objects. Each layout object in the set of layout objects of each document is one of a plurality of layout object types, and each of the plurality of layout object types identify a structural element of a document image. A feature of a document is selected from a set of features, where each of the features in the set of features identify a selected group of layout objects in certain of the sets of layout objects recorded in the memory. A set of image segments is assembled in the memory. Each image segment in the set of image segments identifies those layout objects of a document image stored in the memory that form the selected feature. The assembled image segments are sorted into clusters in the memory, where each cluster defines a grouping of image segments that have similar layout objects forming the selected feature.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. System Overview

Figure 1:
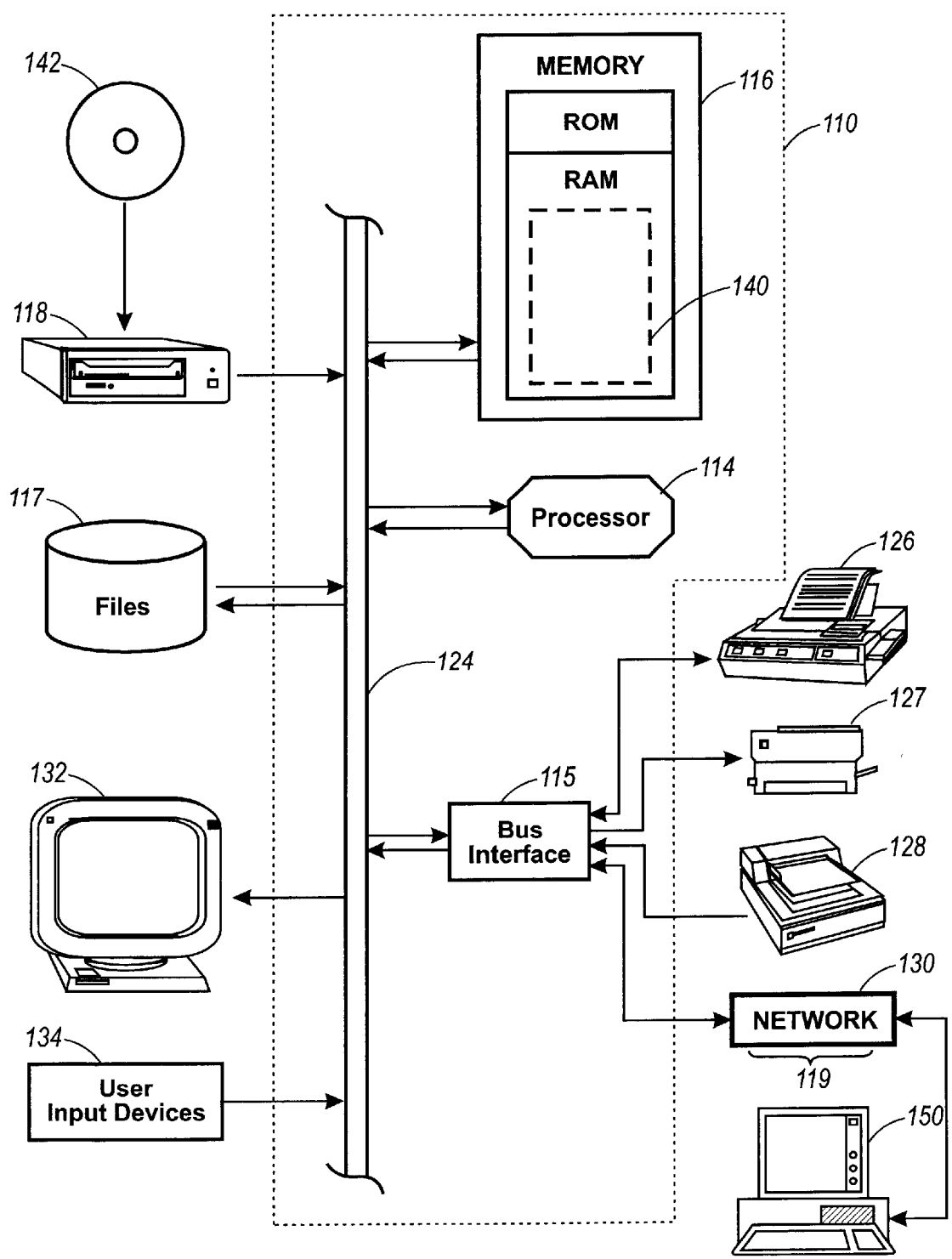
FIG. 1 is a block diagram of the general components used to practice the present invention.

Referring now to the drawings where the showings are for the purpose of describing the invention and not for limiting same, FIG. 1 illustrates a computer system 110 for carrying out the present invention. The computer system 110 includes a central processing unit 114 (i.e., processor) for running various operating programs stored in memory 116 which may include ROM, RAM, or another form of volatile or non-volatile storage. User data files and operating program files are stored on file storage device 117 which may include RAM, flash memory, floppy disk, or another form of optical or magnetic storage.

The computer system 110 is coupled to various I/O (input/output) components 119 through bus interface 115. The I/O components include a facsimile 126, printer 127, scanner 128, and network 130. The processor 114 is adapted to receive and send data from bus interface 115 which couples the various I/O components 119 to processor 114 via bus 124. In response to one or more programs running in memory 116, the processor 114 receives signals from, and outputs signals to the various I/O components 119. Since computer system 110 can be linked to the internet via network 130, processor 114 can receive image data from other scanners, facsimiles, and memory storage devices located on the internet.

Operating in memory 116 is a document corpus search system 140 which includes the present invention. The system 140 may be associated with an article of manufacture that is packaged as a software product in a portable storage medium 142 which can be read by the computer system 110 through access device such as CD ROM reader 118. The storage medium 142 may, for example, be a magnetic medium such as floppy disk or an optical medium such as a CD ROM, or any other appropriate medium for storing data.

Display 132 is provided for displaying user interfaces for relaying information to a user operating the system 140. User input devices 134 which may include but are not limited to, a mouse, a keyboard, a touch screen, are provided for the input of commands by the user. In one instance, the display 132 and the input devices 134 are used to operate a user interface for directing file storage 117 to record images of documents from scanner 128, facsimile 126, or network 130. Also, the user interface can be used for directing file storage 117 to transmit images of documents to facsimile 126, printer 127, or network 130. In one embodiment, the system 140 is operated on computer system 110 through commands received from a browser operating on the internet.

B. Overview of Document Corpus Management And Search System

Figure 2:
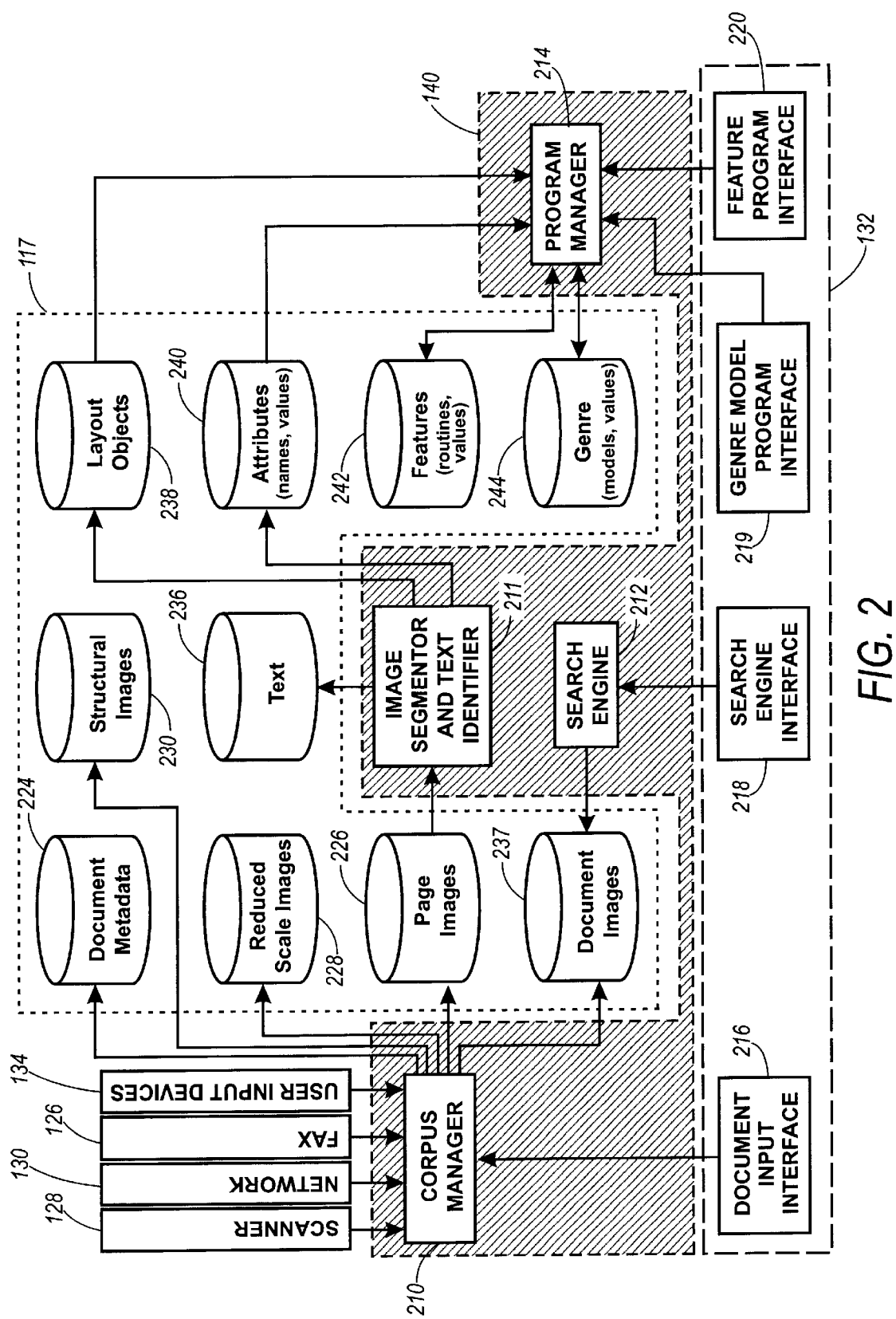
FIG. 2 illustrates a detailed block diagram of the document corpus management and search system shown in FIG. 1.

FIG. 2 illustrates a detailed block diagram of the document corpus management and search system 140 for searching a corpus of documents in accordance with the present invention. The document corpus search system 140 includes four operating components: a corpus manager 210, an image segmentor and text identifier 211, a search engine 212, and a program manager 214. Input from a user to the document corpus search system 140 is made in response to either document input interface 216, search interface 218, genre model program interface 219, or feature program interface 220. Each of the interfaces 216, 218, 219, and 220, which are displayed on display 132, correspond to different services provided by the document corpus search system 140, which are each discussed below. In one embodiment, each of the interfaces 216, 218, 219, and 220 operate over the internet through network 130 through a conventional internet browser such as Microsoft's Explorer™ or Netscape's Navigator™.

In accordance with the present invention, the document corpus management and search system 140 develops a structural description of scanned documents using geometric layout analysis. The structural description of a document is based on the document's configuration or layout format. In developing a structural description of a document, the image segmentor 211 identifies layout objects 238 which are structural descriptions of parts of a document. In addition, the image segmentor 211 computes attributes 240 for the identified layout objects. The attributes of a layout object either quantify a property of the layout object or identify a spatial relationship with respect to other layout objects. Advantageously, geometric layout analysis can be performed to identify structural similarities among documents of a given genre of documents (e.g., memos).

The spatial arrangements of segmented layout objects in the page images of document images (also referred to herein as simply documents) can either be defined using attributes 240 or features 242. In defining spatial arrangements of objects in a page image, the image segmentor 211 examines the structure of text and graphics found in the page image. The text structure of a page image is described in terms of the spatial relations that blocks of text in a page image have to frames of reference that are defined by other blocks of text. Text blocks that are detected by the image segmentor 211 identify a structural element such as a paragraph of text. Unlike text on a page image which may be spatially related, the graphics structure of a page image may involve ad hoc graphical relationships.

The system 140 operates on the general assumption that the genre (i.e., type) of a document image is reflected in the spatial arrangement of at least some of the objects on the page images of the document image. Using the feature program interface, features 242 are defined by a user. In addition to deriving features, a user can specify genre models 244 using genre model program interface 219. Each genre model 244 identifies a spatial arrangement of objects in page images of a document image that are shared between a collection of document images. By defining a genre model, a user is capable of defining a class of document images which express a common communicative purpose that is independent of document content.

C. Classifying A Corpus Of Documents

The service made available through the document input interface 216, provides a facility for populating a database (or collection) of document images 237. The database of document images is populated with either scanned hardcopy documents or electronically generated documents. For example, the scanner 128 can be used to create bitmap images that represent hardcopy documents, whereas the input devices 134 can be used to create electronic documents. In addition, the database of document images can be populated by receiving both scanned hardcopy documents and electronically generated documents over network 130.

The document collection which populates file system 117 is arranged hierarchically. It will be understood by those skilled in the art, that for the purposes of the present invention, the operations set forth herein may be performed on the entire document collection or some subset of the document collection. As part of the file system's hierarchy, each document image 237 is associated with a document data structure which includes an array of one or more pages, a pointer to one or more genre values 244, and a pointer to document metadata 224. Each page in the array of pages is associated with a page data structure which includes a pointer to a page image 226, and can include a pointer to one or more reduced scale images 228, a pointer to one or more structural images 230, a pointer to layout objects 238, a pointer to attributes 240, a pointer to OCRed text 236, or a pointer to feature values 242. In accordance with the hierarchical arrangement, each document image 237 consists in part of one or more page images 226. A page image 226 is defined herein as one page of a scanned hardcopy or electronically generated document.

Responsive to commands from a user, corpus manager 210 records document images 237 in file system 117. Using document input interface 216, a user can manually specify properties of document images which are recorded in file system 117 as document metadata 224. The document metadata 224 may be specified by a user at the time, or some time after, a document image is scanned or otherwise added to the file system 117. More specifically, document metadata 224 for a document image stored in file system 117 may have recorded therein a document type identifier, a document creation date, a document title, and document keywords.

In addition to storing document metadata 224 and page images 226, corpus manager generates reduced scale images 228 and structural images 230. Depending on the preferences of a user, a particular resolution can be selected by a user for viewing the recorded page images. In accordance with user preferences, reduced scale images with varying degrees of resolution are generated for each of the page images 226. In one embodiment, reduced scale images are generated using the method set forth in U.S. Pat. 5,434,953, which is incorporated herein by reference. Generally, reduced scale images are used as a visual index into a higher resolution page image. Similar to the reduced scale images, structural images 230 have varying degrees of resolution that can be specified by a user. However, unlike reduced scale images, structural images 230 highlight particular layout objects in page images. In one embodiment, corpus manager 210 generates reduced scale images and structural images on demand to conserve disk space.

C.1 Layout Object Segmentation

After recording page images 226 of document images 237, image segmentor 211 segments the pages images of each document image into one or more layout objects 238. Each segmented layout object of a page image is identified by image segmentor 211 as one of the primitive layout object types (or "layout objects") listed in Table 1. Layout objects are defined herein as primitive elements which are structural descriptions of abstract parts of a document image. (As defined herein, a document image implicitly refers to its page images.) One skilled in the art, however, will appreciate that the list of primitive layout object types in Table 1 is illustrative and could be modified to include other layout object types. For example, Table 1 could include a layout object for halftone regions.

TABLE 1

Layout Object Types

| OBJECT | EXPLANATION |
| --- | --- |
| Text-Blocks | paragraph-level blocks of text |
| Page | image region occupied by the page |
| Graphics | connected components of salient width and height |
| H-Lines | horizontal straight line segments of graphics |
| V-Lines | vertical straight line segments of graphics |
| H-Rules | horizontal straight lines of salient length |
| V-Rules | vertical straight lines of salient length |
| H-Fragments | horizontal straight line segments of non-salient length |
| V-Fragments | vertical straight line segments of non-salient length |

In one embodiment, the image segmentor 211 performs text block segmentation that is based on standard mathematical morphology methods used for finding text blocks in optical character recognition systems, as discussed by R. Haralick, in "Document image understanding: geometric and logical layout," *Proc. IEEE Conf. On Computer Vision and Pattern Recognition*, 1994: 385–390. In another embodiment, the image segmentor 211 may perform a text block segmentation process that is similar to that employed in the software product TextBridge® produced by Xerox ScanSoft, Inc. Alternate methods of text block segmentation are disclosed in U.S. Pat. Nos. 5,889,886 and 6,009,196.

C.2 Defining Layout Structure

After segmenting the page images of a document image into one or more layout objects 238, image segmentor 211 computes image attributes 240 that correspond to each segmented layout object. The advantage of defining image attributes of layout objects as compared with other image analysis techniques which operate on the textual content of documents is that analyzing a page image to identify its image attributes does not rely on character recognition. Furthermore in certain situations, layout objects of documents offer more information about the genre of a document (e.g., letter, memo, etc.) than the textual content in the page image of a document image. A further advantage, therefore, of the present invention is that it operates regardless of whether there exists any understanding of the textual content of a layout object of a document image. Instead of using textual information to identify the content of layout objects, the present invention develops an understanding of the visual appearance of a document image by analyzing the attributes of layout objects and their relationship to one another.

Different techniques are used to compute the attributes set forth in the Tables 2–6. Many of the attributes which are defined in Tables 2–6, specify the layout structure of a page image in terms of spatial relations that certain blocks of text have in relation to other blocks of text. Two fundamental attributes of layout objects set forth in the Table 2 include attributes that distinguish between running and non-running text blocks (e.g., running, non-running), and attributes that define grouping relations (or alignment) among text blocks (e.g., top-nr, mid-nr, and bot-nr). U.S. Pat. Nos. 5,889,886, and 6,009,196 which are assigned to the same assignee as the present invention and incorporated herein by reference, disclose a method for detecting and classifying non-running text in a page image.

Once identified, non-running text blocks are labeled as having either a top, bottom, or middle position in a page image based on their relative degrees of overlap with the top/bottom, and left/right borders of the image using the method disclosed in U.S. Pat. No. 5,537,491, which is incorporated herein by reference. In addition, non-running text blocks are labeled as having either a left, right, or center vertical alignment. To label a non-running text block as left-aligned, for example, it must belong to a left-x group to which a single-column of running text block also belongs (that is, the left-x value is the same for both the non-running and running text block). This requires that the sufficient stability method set forth in U.S. Pat. No. 5,889,886 is applied independently to the left-x, right-x, and center-x coordinates of all text blocks. In addition, non-running text blocks are labeled as being either a horizontal sequence of text blocks, a vertical sequence of text blocks, or a table using the method disclosed in U.S. Pat. No. 6,009,196. These operations can be combined to define other more specific attributes (e.g., a top-left-aligned non-running text-block). Also, these operations can be combined with additional operations to impose further geometric constraints on image attributes (e.g., a top-left-aligned non-running text-block which is normalized relative to the total text-block area in a top non-running text region).

The attribute types for layout objects are divided into generic attribute types and specific attribute types and stored in file system 117 as attributes 240. Generic attribute types are attributes that are defined for every primitive layout object. Table 2 illustrates generic attributes of each layout object (i.e., I/o) listed in Table 1. Specific attribute types are attributes that are defined specifically for a specific type of layout object. For example, Table 3 lists type specific attributes for text objects, Table 4 lists type specific attributes for graphic objects, and Table 5 lists type specific attributes for page objects. In addition, generic and specific attribute types of a layout object can be used to define composite attributes. Table 6 illustrates composite attributes that are defined using generic types of objects.

TABLE 2

Type Generic Attributes For All Objects

| ATTRIBUTE | EXPLANATION |
|---|---|
| running | I/o is a running text region |
| non-running | I/o is a non-running text region |
| top-r | I/o is a running text region adjacent to the top image border |
| mid-r | I/o is a running text region not adjacent to the top image border |
| bot-r | I/o is in a running text region adjacent to the bottom image border |
| top-nr | I/o is a non-running text region adjacent to the top image border |
| mid-nr | I/o is a non-running text region not adjacent to the top or bottom image border |
| bot-nr | I/o is a non-running text region adjacent to the bottom image border |

TABLE 2-continued

Type Generic Attributes For All Objects

| ATTRIBUTE | EXPLANATION |
|---|---|
| type | a numerical encoding of the type of I/o (e.g., text, graphics, etc.) |
| left-x | the minimum x-coordinate in I/o |
| top-y | the minimum y-coordinate in I/o |
| right-x | the maximum x-coordinate in I/o |
| bot-y | the maximum y-coordinate in I/o |
| x-span | bounding box width of I/o |
| y-span | bounding box height of I/o |
| girth | the maximum of all shortest cross-sections of I/o |
| area | the area of I/o in pixels |
| box-area | the area of the bounding box of I/o in pixels |

TABLE 3

Type Specific Attributes For Text Objects

| ATTRIBUTE | EXPLANATION |
|---|---|
| left-aligned | I/o is left-aligned with the running text |
| center-aligned | I/o is center-aligned with the running text |
| right-aligned | I/o is right-aligned with the running text |
| single-column | I/o is a single-column running text |
| multi-column | I/o is multi-column running text |
| two-column | I/o is two-column running text |
| three-column | I/o is three-column running text |
| four-column | I/o is four-column running text |
| tables | I/o is in a three-or-more column tabular structure |
| pairings | I/o is a two-column tabular structure |
| b-internal | I/o is inside the bounding box of a Graphic Object |
| h-internal | I/o is bounded above and below by H-Rule Object |
| v-internal | I/o is bounded left and right by V-Rule Object |
| cavity-area | the area of top and bottom cavities of I/o in pixels |
| table-row | the row-index of I/o in a tabular structure, if any |
| table-col | the column-index of I/o in a tabular structure, if any |

TABLE 4

Type Specific Attributes For Graphics Objects

| OBJECT | ATTRIBUTE | EXPLANATION |
|---|---|---|
| Graphics | occupancy | text pixel count inside the bounding box of I/o |
| V-Rules | h-occupancy | text pixel count between I/o and the V-Rule immediately right of it. |
| V-Rules | h-index | horizontal index of I/o relative to the set of V-Rules |
| H-Lines | h-occupancy | text pixel count between I/o and the H-Rule immediately below it. |
| H-Lines | h-index | horizontal index of I/o relative to the set of H-Rules |
| V-Lines | h-occupancy | text pixel count between I/o and the V-Line immediately right of it. |
| V-Lines | h-index | horizontal index of I/o relative to the set of V-Lines |
| H-Fragments | v-occupancy | text pixel count between I/o and the H-Rule immediately below it. |
| H-Fragments | v-index | vertical index of I/o relative to the set of H-Rules |
| H-Fragments | text-adjacency | count of adjacent Text-Block pixels |
| V-Fragments | v-occupancy | text pixel count between I/o and the V-Fragment immediately right of it. |
| V-Fragments | v-index | horizontal index of I/o relative to the set of V-Fragments |
| V-Fragments | text-adjacency | count of adjacent Text-Block pixels |

TABLE 5

Type Specific Attributes For Page Objects

| ATTRIBUTE | EXPLANATION |
| --- | --- |
| contracted-width | the width of a set of objects, ignoring white space |
| contracted-height | the height of a set of objects, ignoring white space |
| aspect-ratio | x-span divided by y-span |

TABLE 6

Composite Attributes

| ATTRIBUTE | EXPLANATION |
| --- | --- |
| top-r-or-nr | conjunction of top-r and top-nr |
| bot-r-or-nr | conjunction of bot-r and bot-nr |
| aspect-ratio | x-span divided by y-span |

Attributes set forth in each of the Tables 2–6 can be binary-valued (i.e., true/false) or numerical-valued (i.e., integer or real). Those attribute types listed in the Tables 2–6 in italic font have boolean values. Binary valued attributes typically represent set membership relations among layout objects. For instance, the generic attribute types that are binary valued attributes such as "running" and "non-running" define grouping relations among layout objects. Numerical valued attributes typically represent intrinsic geometric properties of objects, or indices into sets with respect to ordinal relations. Although the values of the type attributes are represented as symbols in the Tables 2–6 for clarity, it will be understood by those skilled in the art that the values of the attributes, which are absolute (i.e., not normalized), are represented numerically.

After identifying layout objects 238 for each page image 226, those layout objects identified as text blocks can be further processed by a text identifier which forms part of image segmentor 211. In one embodiment, each layout object identified as a text block is processed by text identifier 211 using an optical character recognition technique or a suitable alternative technique to recognize text located therein. It will be appreciated by those skilled in the art, however, that for the purposes of the present invention, there is no requirement to perform OCR on layout objects identified as text blocks. There exists, however, certain advantages for recognizing the text within layout objects identified as text blocks as will become evident from the teachings discussed below. Text that is recognized within a text-block layout object is stored in file system 117 as text 236, and may be searched using text based searches with search engine interface 218.

C.3 Overview of Image Data

Figure 3:
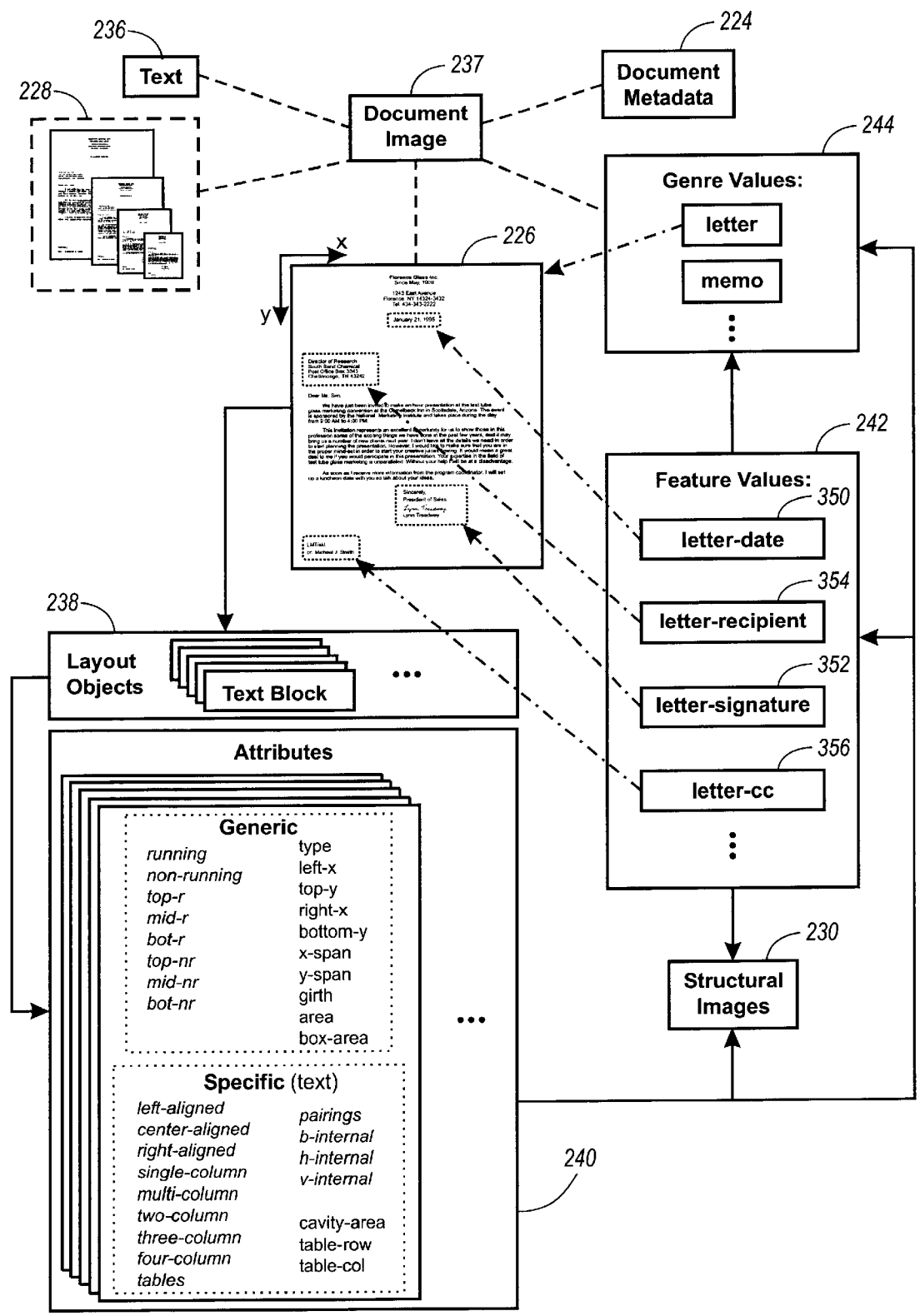
FIG. 3 illustrates the manner in which document image data is arranged in the file system.

FIG. 3 illustrates the organization of data that is associated with each of the page images 226 of a document image 237 stored in the file system 117. Initially, a user populates file system 117 with for example scanned images received from document scanner 128. Document metadata 224 for a document image can be entered by a user as type, date, title, and keyword information. Corpus manager 210 sub-samples page images 226 to form a set of reduced scale images 228. The reduced scale image with the lowest resolution is defined herein to be a thumbnail image. Other page images in descending resolution are defined herein to be large, mid, and small images. In addition, structural images 230 can be computed for each segmented layout object 238. As set forth above, image segmentor 211 segments the page images 226 of a document image into layout objects 238. For each of the layout objects that are segmented from the page images 226, the image segmentor further computes and stores in a compact form image attributes 240. The image attributes 240 can either be type-generic or type-specific attributes. In addition to attributes, each layout object 238 of a page image can be associated with one or more features 242 or genre models 244. The features 242 are defined using attributes 240 as described below in Section D. The genre models 244 are defined using either attributes 240 or the features 242 as set forth in Section E below.

D. Defining The Layout Format Of Documents Using Features

Using the feature program interface 220, a user is able to specify a layout format that is unique to a particular genre of document by constructing a routine for detecting a feature. For example, a routine of a feature of a page image can be used to identify document images with a unique letterhead. In general, each feature 242 is defined by a routine and a value. The routine of a feature is a straight-line program having a sequence of one or more steps with no explicit branch operations. Each step of a routine is a selection operation that either gates or filters a set or a subset of layout objects of a page image 226. Each selection operation of a routine is programmed by the user with the feature program interface 220. A routine takes as input a set or subset of layout objects of a page image. Depending on the selection operation(s) of a routine and the layout objects being evaluated, the output of the routine is either a set of all, some, or none of the layout objects input into the routine.

Once a user programs a feature at the feature program interface 220, the program manager 214 records the routine of the feature with other features 242 in file system 117. In addition, the program manager 214 performs, at some user specified time, selection operations specified in the routine, on each page image 226 in files system 117, a page image at a time. In other words, selection operations are performed by the program manager with respect to the layout objects of a single page image irrespective of the number of page images forming a document image. At each step of a routine, a determination is made by the program manager 214 as to whether the computed attributes (see Tables 2–6 for examples of attributes) of layout objects meet the specified constraints. The end result after making a determination for each step in a routine is a value for the page image. If the value of a feature for a page image is an empty (or null) set of layout objects, then the feature is not present in the page image. In contrast, if the value of a feature is a non-empty set of layout objects, then the feature is present in the page image.

In one embodiment, a feature is recorded in file system 117 with a list of page images that have layout objects which satisfy the selection operations of the feature. For quick retrieval, an index of those layout objects which satisfy the selection operations of the features are stored along with each page image in file system 117. In effect, a feature 242 is used to identify page images 226 with layout objects 238 having attributes 240 that satisfy the programmed selection operation(s) of the feature. As additional page images 226 are added to the corpus of page images, layout objects 238, attributes 240, and features 242 can be computed for those additional page images. This computation need only be done once in general, this insures that invoking search engine 212 does not involve run-time image analysis of page images.

D.1 Programming Routines

After a set of image attributes have been computed for segmented layout objects a given corpus of document images, features can be defined using those attributes.

Furthermore, after defining one or more features, new features can be defined using both attributes and any existing features. In this manner, features can be defined using previously defined features. Features, for example, can be defined using one or more routines (or functions) to perform selection operations over regions that have a particular structural layout in a page image. In its simplest form, a routine is defined so that when it is applied to a page image, the output of the routine is a set of layout objects in the page image which satisfy the definition of the routine.

In effect, the layout format of a page image may be programmed using routines that operate on sets of layout objects 238. A user programs routines using a program composition language which only requires a user to define sequences of primitive operations or other previously defined routines. These sequences of primitive operations can either be applied to the entire corpus of documents or to a subset of the corpus of documents stored in file system 117. When the corpus is populated as set forth in Section C above, there is defined for each page image 226 a set of layout objects $L_i$ which specifies the set of all layout objects defined for a given page image. When executed, each routine consumes a set of layout objects $L_i$ and produces a new set of layout objects $L_o$, where $L_o$ is a subset of the set of layout objects $L_i$.

Some routines R that are programmed using the program composition language perform either composition of filter operations and/or gate operations. A filter operation $F(L,A, u,v,N)$ produces a subset of layout objects in L whose value of attribute argument A is not less than threshold uN but less than threshold vN. A gate operation $G(L,A,u,v,N)$ produces the set of layout objects L itself if the value of the attribute argument A of L is not less than threshold uN but less than threshold vN; otherwise, it produces an empty set (i.e., $\phi$). The gate operation provides a certain capacity of conditional behavior. Once defined, each selection operation of a routine, whether a gate operation or a filter operation, can be applied to the layout objects of each of the page images 226 stored in files system 117. The filter and gate selection operations can be defined mathematically as follows:

$$F(L,A,u,v,N)=\{l\epsilon L:uN \leq A(l)<vN\};$$

and $$G(L, A, u, v, N) = \begin{cases} L & \text{if } uN \leq A(l) < vN \text{ for all } l \text{ in } L \\ \phi & \text{otherwise,} \end{cases}$$

where,

L is an input argument that specifies a set of layout objects to which each operation is applied;

A is an attribute argument that may be specified as either: a name of an attribute; or a name of a feature; (In the event the attribute argument A is defined in a routine R, the attribute argument A is interpreted as a new binary valued attribute A as follows:

$$A(l) = \begin{cases} 1 & \text{if } l \in R(L) \\ 0 & \text{otherwise.} \end{cases}$$

u and v are threshold arguments that may be either integer constants or real-valued scale factors; and N is a normalization argument that is a numerical value.

Other routines R that are programmed using the program composition language consume a set of layout objects L and produce a scalar numerical value. The scalar numerical value represents a global value of layout objects which can be used in all the selection operations to specify one of the threshold arguments u or v, or to specify the attribute argument A of a gate operation. Such routines which produce a scalar numerical value are defined herein as accumulation operations. The feature composition language provides a user with the ability to define routines using the following three accumulation operations:

max, max(L,A), produces the maximum value of A for any $l \in L$;

min, min(L,A), produces the minimum value of A for any $l \in L$; and sum, $\Sigma(L,A)$, produces the sum of the values of A for all $l \in L$.

These accumulation operations can compose with the filter and gate selection operations in that L may be the result of a sequence of operations.

D.2 The Feature Program Interface

Figure 4:
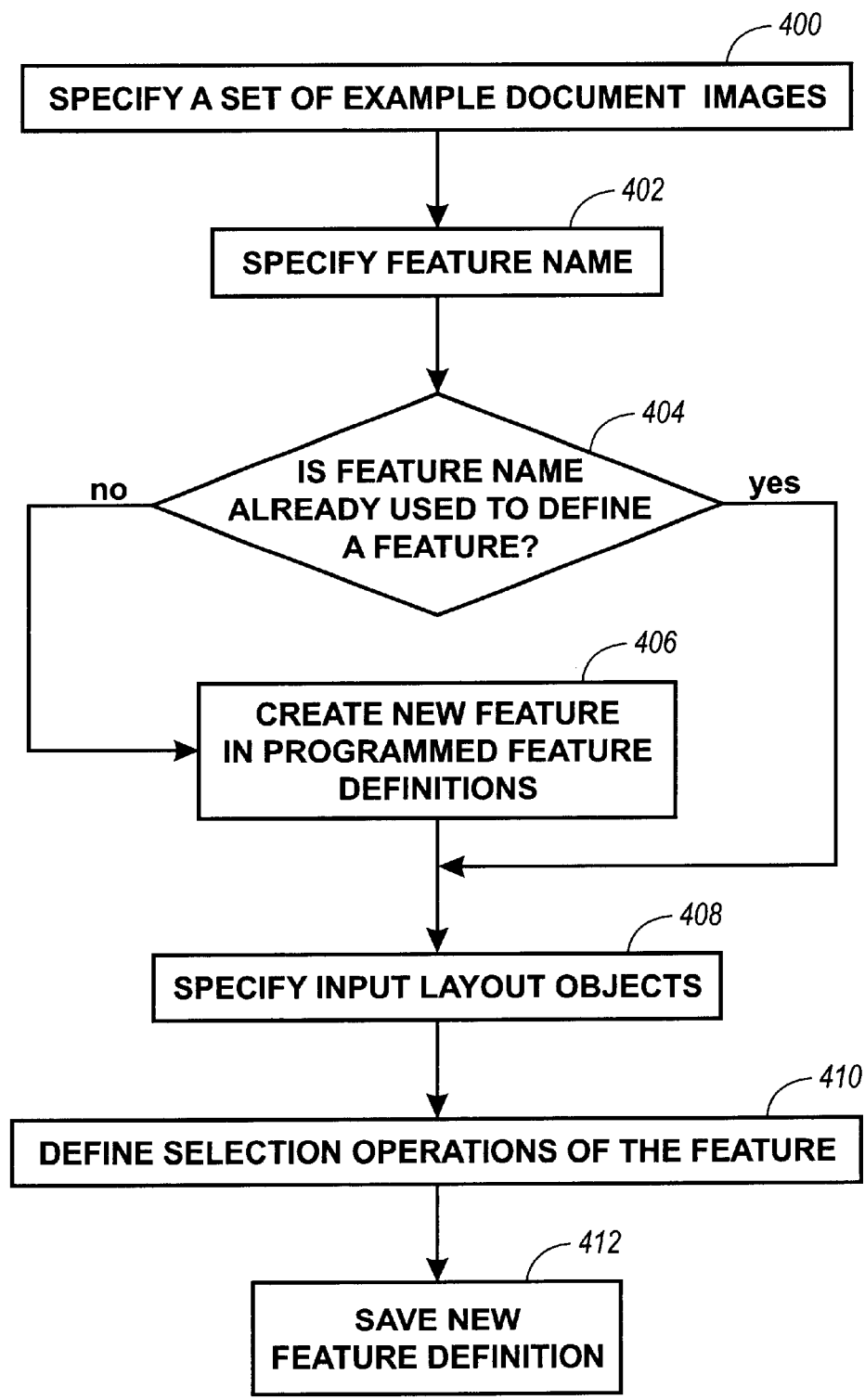
FIG. 4 is a flow diagram of an interaction cycle for defining a feature using sequences of primitive operations.

FIG. 4 is a flow diagram of an interaction cycle for defining a feature using sequences of primitive operations (i.e., a straight-line program). The steps of the interaction cycle are generic and can be used to implement any graphical, interactive, incremental programming interface. An advantage of the interaction cycle is that each step of the straight-line program being constructed may be immediately verified with respect to its effects on a user-specified example of page images. In the feature program interface 220 (shown in FIG. 2) the interaction cycle is displayed graphically as it is constructed. That is, any modification to the displayed program between steps results in immediate updating and redisplay of results on the selected examples.

At step 400, the interaction cycle begins by requesting a user to specify a set of example document images 237 or page images 226. At step 402, the user is requested to specify a programmed feature name. If the feature name specified at step 402 is an existing programmed feature 242, then step 408 is performed; otherwise, step 406 is performed. At step 406, a new feature is created in the set of features 242. The routine defining the feature name specified at steps 404 or 406 is defined at steps 408 and 410. At step 408, a set of the layout objects 238 is specified as input layout objects of the selected feature. More specifically, at step 408 a user defines the input argument L which specifies the set of layout objects to which the first operation defined at step 410 is applied. (This entry corresponds to step zero in the exemplary tables 7–16 set forth below.) At step 410, one or more selection operations for the feature being defined is specified by the user. The interaction cycle terminates at step 412 at which point the programmed feature is saved in file system 117.

Figure 5:
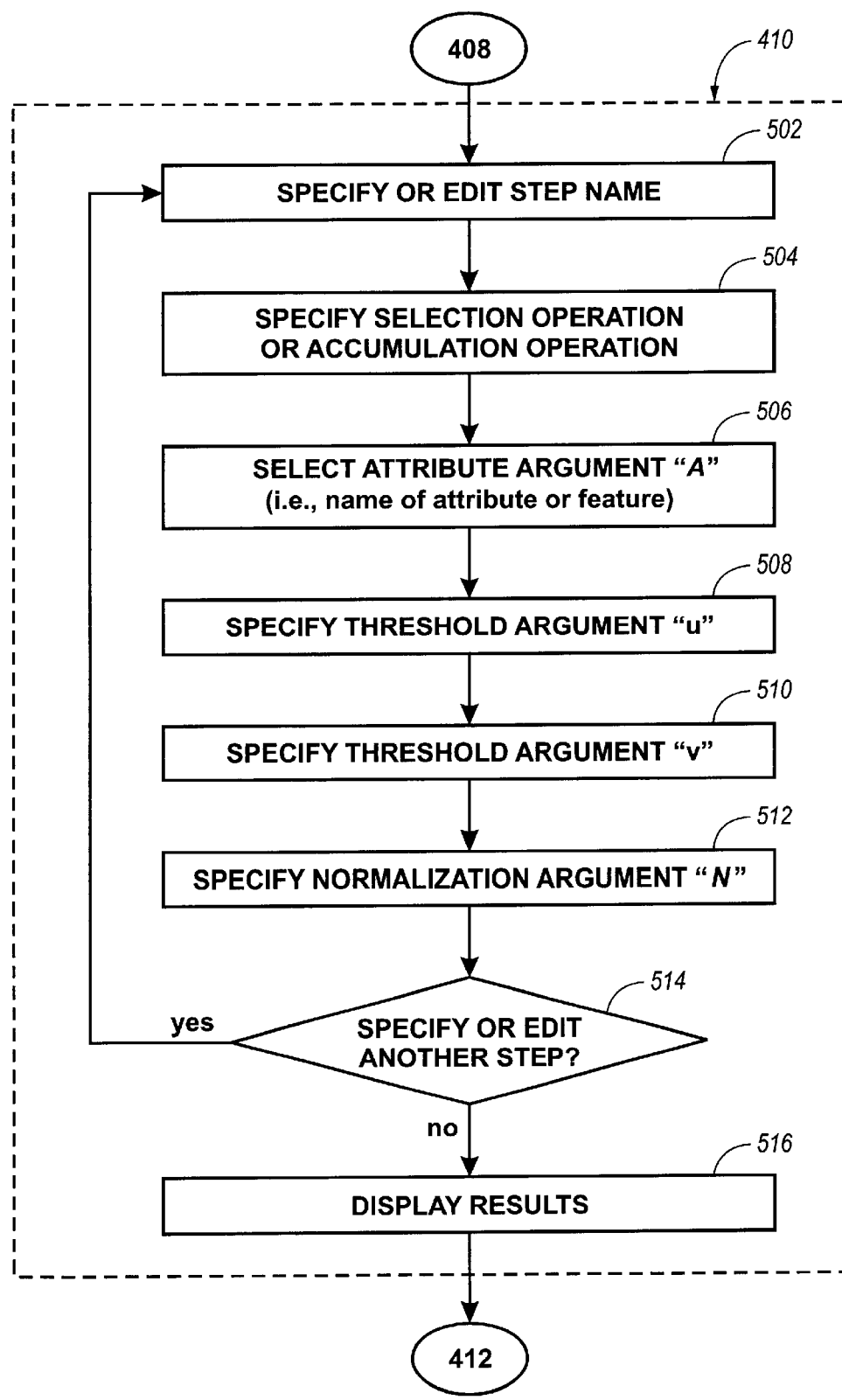
FIG. 5 is a flow diagram which sets forth the steps for specifying one or more selection operations or accumulation operations for the set of layout objects defined at step 408 in FIG. 4.

FIG. 5 is a flow diagram which sets forth the steps for specifying one or more selection operations or accumulation operations for the set of layout objects defined at step 408. At step 502, a first step name of the selected feature is either specified or edited. Subsequently, either a filter selection operation, a gate selection operation, or an accumulation operation is specified at step 504. At step 506, the attribute argument of the filter selection operation is specified. The feature argument specified can either be an attribute or a feature. At steps 508, 510, and 512 the user is prompted for a threshold argument u, a threshold argument v, and a normalization argument N, respectively. At step 514, the user is prompted to define other steps for the feature. If all steps have been defined, then the results are displayed to the user at step 516; otherwise, step 502 is repeated. After displaying the new feature step(s) at step 516, the new feature definition is saved in file system 117 at step 412.

D.3 Examples Of Programmed Features

Figure 6:
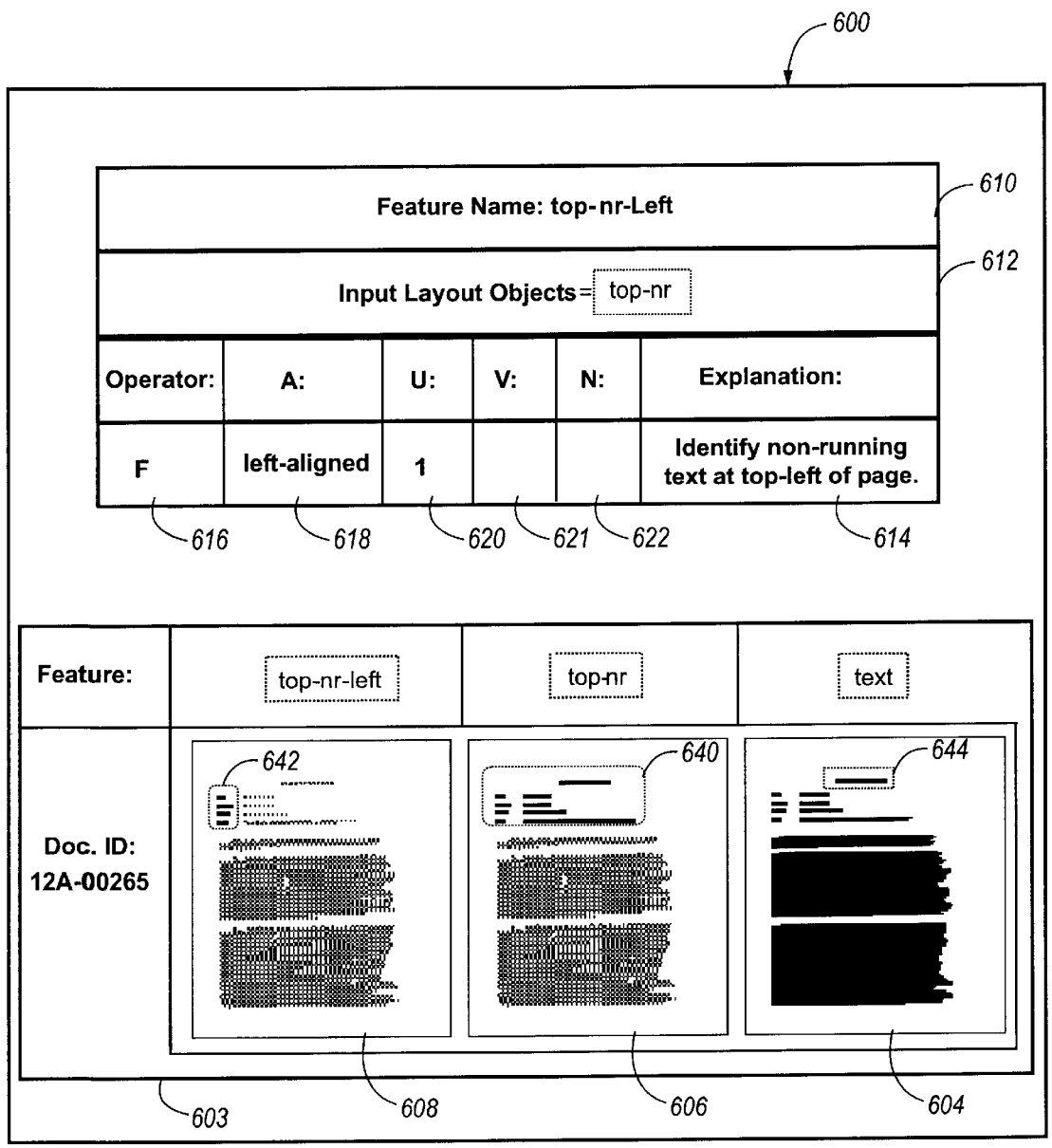
FIG. 6 illustrates an example of a feature programmed using the interaction cycle set forth in FIGS. 4–5.

FIG. 6 illustrates an example of a feature programmed using the interaction cycle set forth in FIGS. 4–5. The programmed feature is displayed with user interface 600 on a display such as display 132 (shown in FIG. 1). Alternatively, the user interface 600 can be displayed using any internet browser such as the Netscape's Navigator™ and Microsoft's Explore™. For illustrative purposes, the example shown in FIG. 6 is described with respect to the steps outlined in the interaction cycle set forth in FIGS. 4–5.

Initially, a single image with document identifier "12A-00265" is specified as the set of example document images in display area 603 in FIG. 6, as set forth at step 400 of the interaction cycle shown in FIG. 4. The selected example document image "12A-00265" (i.e., doc. ID) in FIG. 6 has three structural images 604, 606, and 608. Each of the three structural images identifies a particular feature or attribute relating to the recorded document image. The darkened areas in each of the structural images 604, 606, and 608 indicate areas identified as having a particular property. More specifically, structural images 604, 606, and 608 illustrate a page image in the document image identified by identifier "12A-00265" with the attribute of type text, the attribute top-nr, and the attribute top-nr-left, respectively. (The type attribute, the top-nr attribute, and the top-nr-left attribute are defined in Table 2.)

After defining a set of example images 404, the feature name "top-nr-left" is specified at step 402 (in FIG. 4) as shown in display area 610. At step 408, the input layout objects are specified as illustrated in this example by those layout objects having the top-nr (i.e., top non-running) attribute as shown in display area 612. After defining the input objects for the programmed feature, the operations for the selected feature are defined at step 410, the steps of which are set forth in detail in FIG. 5. Initially, the explanation for the selection operation or accumulation operation of the feature is set forth as shown in display area 614 (i.e., step 502). In display area 616, the selection operation is specified as the filter operation (i.e., step 506). In display area 618, the attribute argument A is selected as the left-aligned feature which is defined in Table 3 (i.e., step 508).

Display areas 620 and 621 correspond to the threshold argument u and the threshold argument v (i.e., steps 508 and 510), respectively. When the threshold argument u is specified to be equal the integer one and the feature argument has a boolean result, the desired boolean value is indicated to be TRUE (as shown in FIG. 6). More generally, the threshold arguments u and v can be specified using either user defined values, displayed values, or statistically generated values. User defined values can be entered by a user with a keyboard or the like. Displayed values can be selected by a user from a slider display area with a pointing device or the like. Statistically generated values are automatically generated by the system 140 after a user clicks on positive and negative exemplars of features in example images.

The normalization argument N is recorded in display area 622 (i.e., step 512). When the threshold arguments u and v are constants, the normalization argument will simply default to one. That is, without specifying the normalization argument N, the threshold arguments u and v define an absolute range of values. However, when a value is specified for the normalization argument N, the threshold arguments u and v define a relative range of values.

Table 7 illustrates a list of the selection operations that define the top-nr-left feature shown in FIG. 6. At step zero, the set of input layout objects are specified (i.e., step 408 in FIG. 4). The value "ALL" indicates that all layout objects in the file system 117 are to be input to the filtering operation specified at step one. Step one selects only those layout object which have the type attribute equal to "text-block". The second step selects all layout objects with the text-block attribute that have the attribute top-nr equal to TRUE. Finally at the third step, only those layout objects with the left-aligned feature equal to TRUE are selected. In FIG. 6, the top-nr-left feature is defined using a single step because the input layout objects for this feature are defined as those layout objects having top-nr equal to TRUE as indicated at display area 612.

TABLE 7

| Step | Name | Op | A | u | v | N |
|---|---|---|---|---|---|---|
| 0 | ALL | | | | | |
| 1 | text | F | type | Text-Blocks | | |
| 2 | top-nr | F | top-nr | 1 | | |
| 3 | top-nr-left | F | left-aligned | 1 | | |

Table 8 sets forth the steps for defining another example of a feature defined using the feature composition language set forth above. More specifically, Table 8 illustrates a list of all filtering operations that define the top level feature "4-memo-marks". Unlike the feature top-nr-left which identifies an unlimited number of objects on the upper left side of a page image, the feature 4-memo-marks only identifies four marks that are on the left side of a page image. (Memo marks are defined herein as text blocks which correspond to the words "to:", "from:", "re:", and "date:" in the header of a document.) As set forth above, each attribute of a layout object has a corresponding global or page level attribute. These global or page level attributes or features are denoted herein in brackets. At step one in this example, only those objects which span less than 10% of the x-dimension of the document (i.e., <x-span>) are selected to be filtered at next step. At step two, only those objects which are non-running text at the top of a document are selected to be filtered at step 3. Finally, if exactly four layout objects are identified in a page image, at step two, then that set of layout objects passes through the gate at step three. An example of four memo marks is shown in FIG. 6 by the area indicated by reference number 642 in structural image 608.

TABLE 8

| Step | Name | Op | A | u | v | N |
|---|---|---|---|---|---|---|
| 0 | ALL | | | | | |
| 1 | narrow | F | x-span | 0.0 | 0.1 | <x-span> |
| 2 | temp | F | top-nr-left | 1 | | |
| 3 | 4-memo-marks | G | <count> | 3 | 4 | |

Table 9 illustrates an example of one of the accumulation operations set forth above. Specifically, Table 9 illustrates an example of the "min" accumulation operation. At step zero, only those objects which satisfy the feature "4-memo-marks" defined in Table 8 (i.e., step zero in Table 9 is interpreted to include each steps 0–3 set forth in Table 8) are input layout objects to step one. (As defined above, elements defined in brackets (e.g., <4-memo-marks-top-y>) are global or page level attributes or features.) At step one, the global feature "4-memo-marks-top-y" is defined. This global feature identifies a value for the upper-most layout object in a page image that is labeled as the feature 4-memo-marks. The "min" accumulation operation produces a minimum value for any layout object in the set of layout objects L with the attribute arguments A. For example, the output of the accumulation operation on the four memo marks illustrated in area 642 in FIG. 6 is defined by the minimum y value of those remaining layout objects in the page image (i.e., the y coordinate of the upper most memo mark, where the origin of the x-y coordinate system for a page image is defined as the upper left corner of an image as shown in FIG. 3 on page image 226).

TABLE 9

| Step | Name | Op | A | u | v | N |
|------|------|----|----|----|----|----|
| 0 | 4-memo-marks | | | | | |
| 1 | <4-memo-marks-top-y> | min | top-y | | | |

Another example of a selection operation using the feature programming language is illustrated in Table 10. Specifically, Table 10 sets forth the steps for defining a memo-header feature. An example of a memo-header feature is shown by the outlined area identified by reference number 640 in structural image 606 shown in FIG. 6. At step zero in Table 10, all those objects which satisfy the top-nr attribute in Table 2 are selected to be filtered at step one. At step one, layout objects are selected only if the attribute argument of its top-y attribute is between the thresholds uN and vN, where the value of lower limit (i.e., uN) is the value of the global feature <4-memo-marks-top-y> defined in Table 9 and the value of the upper limit (i.e., vN) can be infinitely large. In other words, the feature memo-header identifies all non-running text that is at the top of the page but below the highest ordered memo-mark, thereby eliminating the layout objects identified by reference number 644 in structural image 604.

TABLE 10

| Step | Name | Op | A | u | v | N |
|------|------|----|----|----|----|----|
| 0 | top-nr | | | | | |
| 1 | memo-header | F | top-y | 1.0 | ∞ | <4-memo-marks-top-y> |

Tables 12–17 set forth the steps for defining each of the features letter date 350, letter-signature 352, letter-recipient 354, and letter-cc 356 illustrated in page image 226 in FIG. 3. At step zero in Table 11, every available layout object is specified as the input layout objects of this feature. At step one, only those objects which have the attribute top-nr-table equal to FALSE are selected to be filtered at step two. The top-nr-table feature is defined in Table 12. Subsequently at step two, only those objects which have the attribute top-nr-center equal to TRUE are selected to be filtered at step three. The top-nr-center feature is defined in Table 13. Finally, the feature letter-date is identified by all those layout objects which are selected at step two and have a maximum y-coordinate equal to at least the global <bot-y> coordinate. It should be noted that the global <bot-y> coordinate corresponds to the global coordinate for only those layout objects which are selected at step 2.

TABLE 11

| Step | Name | Op | A | u | v | N |
|------|------|----|----|----|----|----|
| 0 | ALL | | | | | |
| 1 | non-top-nr-table | F | top-nr-table | 0 | | |
| 2 | top-centered-stuff | F | top-nr-center | 1 | | |
| 3 | letter-date | F | bot-y | <bot-y> | | |

TABLE 12

| Step | Name | Op | A | u | v | N |
|------|------|----|----|----|----|----|
| 0 | top-nr | | | | | |
| 1 | temp1 | F | tables | 1 | | |
| 2 | temp2 | G | <count> | 5 | ∞ | |
| 3 | top-nr-table | G | <area> | 0.3 | 1.0 | <box-area> |

TABLE 13

| Step | Name | Op | A | u | v | N |
|------|------|----|----|----|----|----|
| 0 | top-nr | | | | | |
| 1 | top-nr-center | F | center-aligned | 1 | | |

Table 14 sets forth the steps for defining the selection operations of the letter-recipient feature 354 shown in FIG. 3. Step zero indicates the input layout object of this feature include all layout objects. At step one, only those layout objects which are of type text block are selected to be filtered at step two. At stop two, only those layout objects that are have the top-nr feature equal to TRUE, are selected. At step three, only those layout objects with an area between 10% and 60% of the area of the top-nr objects' collective bounding box are selected. For those remaining layout objects at step 4, only those which have the left-aligned attribute equal to TRUE satisfy the left-aligned feature.

TABLE 14

| Step | Name | Op | A | u | v | N |
|------|------|----|----|----|----|----|
| 0 | ALL | | | | | |
| 1 | text | F | type | text-block | | |
| 2 | top-nr | F | top-nr | 1 | | |
| 3 | big-top-nr | F | area | 0.1 | 0.6 | <area> |
| 4 | letter-recipient | F | left-aligned | 1 | | |

Table 15 sets forth the steps for defining the letter-cc feature 356 shown in FIG. 3. Only those layout objects which have the attribute type equal to the value for text-block are selected at step one. At step two, those layout objects from step one are selected which have the attribute bot-nr equal to TRUE. At step three, only those layout objects with the attribute left-aligned equal to TRUE are selected to satisfy the letter-cc feature. Table 16 sets forth the steps for defining the letter-signature feature 352 shown in FIG. 3. Unlike the letter-cc feature, at step three only those features with the left-aligned attribute equal to FALSE are selected to satisfy the letter-signature feature.

TABLE 15

| Step | Name | Op | A | u | v | N |
|------|------|----|----|----|----|----|
| 0 | ALL | | | | | |
| 1 | text | F | type | text-block | | |
| 2 | bot-nr | F | bot-nr | 1 | | |
| 3 | letter-cc | F | left-aligned | 1 | | |

TABLE 16

| Step | Name | Op | A | u | v | N |
|------|------|----|----|----|----|----|
| 0 | ALL | | | | | |
| 1 | text | F | type | text-block | | |

TABLE 16-continued

| Step | Name | Op | A | u | v | N |
|---|---|---|---|---|---|---|
| 2 | bot-nr | F | bot-nr | 1 | | |
| 3 | letter-signature | F | left-aligned | 0 | | |

E. Defining Genre Models

An advantage of the corpus management and search system 140 is that it is capable of performing structural analysis at two levels. At the lower level, specific layout formats of a document can be identified (e.g., the recipient field of a letter or the header field of a memo). Such identification is performed herein using features. At the higher level, the entire configuration of an input document is captured using genre models. For example, a "business letter" is a genre model of a document that can be defined in most instances by a letter-date feature, a letter-recipient feature, a letter-cc feature, and a letter-signature feature (as shown in FIG. 3). Although some models may have some features in common, such models may still be distinguishable from each other by either the presence or absence of other features. For example, a memo and a letter may have similar letter-signature features while each may have different document header features (e.g., four-memo mark and letter-recipient).

Figure 7:
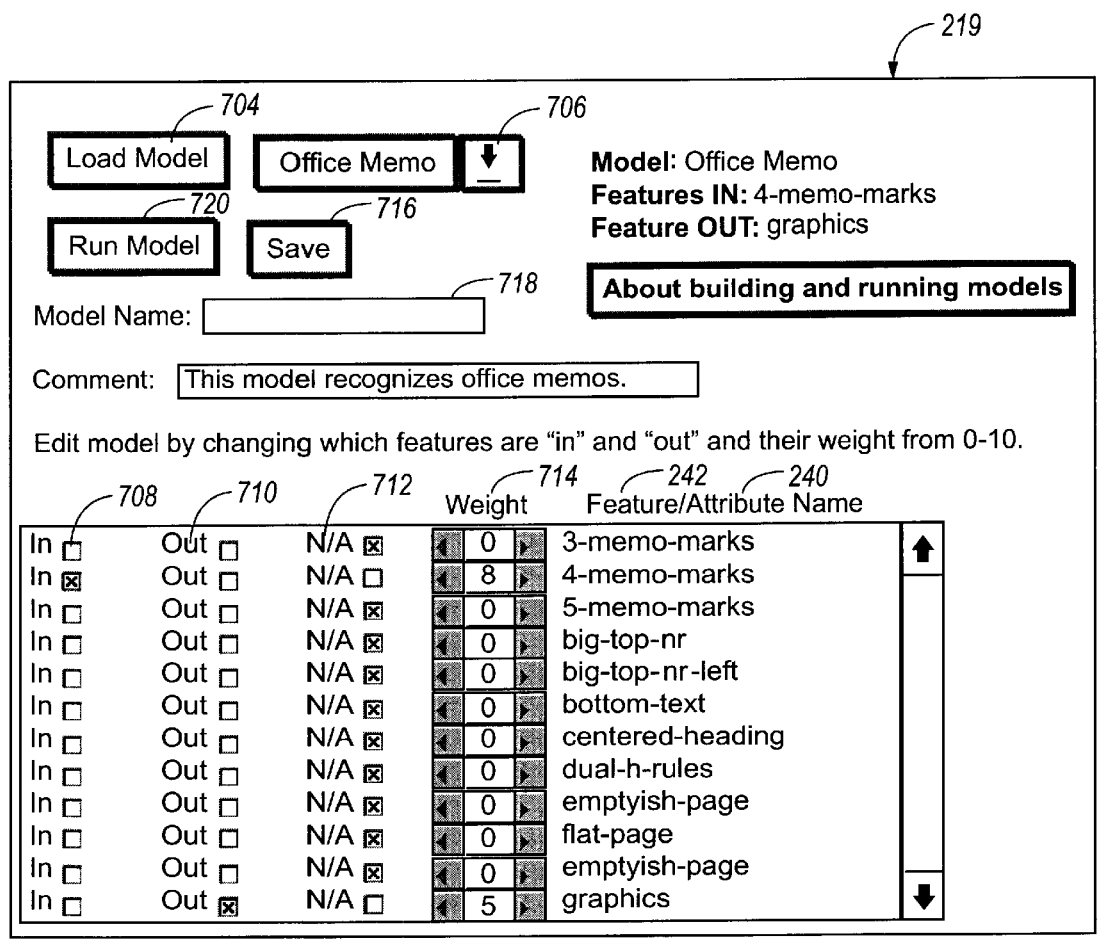
FIG. 7 illustrates in greater detail the genre model program interface 219 shown in FIG. 2.

FIG. 7 illustrates the genre model program interface 219 (shown in FIG. 2) in greater detail. Using the genre model program interface 219, a user is free to define a model of a genre which is stored in file system 117 as a genre model 244. Besides defining a genre model, the model program interface 219 can be used to load and run a genre model that has already been defined. As defined above, each genre model 244 specifies a common communicative purpose which is unrelated to the content of the document, such as a memo, article, or letter. Given appropriate features (or attributes), a genre model may be specified by defining a set of features which the model should include (i.e., features in") and a set of features which the model should exclude (i.e., "features out"). The specification of each set can be performed interactively as discussed below by repeatedly selecting features from a predefined list. Once a model is defined it can be tested against the page images stored in the corpus of page images. It will be understood by those skilled in the art, however, that a model could also be constructed automatically by specifying a set of example page images and a set of features for a learning system such as a neural network.

In operation, a user creates or modifies a model using genre model program interface 219 by combining features 244 and attributes 242. A model is loaded in the genre model program interface 219 using the "load model" button 704 after selecting a model from pull down menu 706. For each feature or attribute, each model stores a value of "In", "Out", "N/A", and weight, each of which is indicated by reference numbers 708, 710, 712, and 714, respectively. For example, the model shown in FIG. 7 includes those documents with the feature 4-memo-marks (i.e., marked as "In") and excludes those documents which have graphics features (i.e., marked as "Out"). However as discussed below, this constraint can be relaxed by assigning non-zero weights to the features. All other features and attributes marked as N/A are not applicable to this model. To save a new model, save command button 716 is selected after entering a new model name into the text field 718. In addition, the save command button 716 can be used to save changes made to an existing model.

For efficiency, each page image has a pre-coded vector of binary values which indicate whether each feature and attribute is true or false. The pre-coded vector increases the speed of matching a page image to particular model. When a model is run by selecting command button 720, a separate window or web page (not shown) displays reduced scale images 228 of the first page image of document images 237 that match the model. When a document image matches a model, all of the features and attributes marked as "In" are true for a page image of the document image, while all of the features and attributes marked as "Out" are false for any page image of the document image. Features and attributes marked as "N/A" are not relevant.

The weight, which can range between zero and ten, is used to rank those document images in the corpus which do not satisfy every "In" and "Out" selection for a particular model. If the weight for a feature/attribute is specified to be zero, then the feature/attribute must match the "In" or "Out" selection for a document image to satisfy a particular model; otherwise, document images can satisfy a particular model with only a sub-set of matching "In" and "Out" selections. In the event a weight value is not zero, search results are arranged in descending order by the sum of their weights that correspond to features which presence or absence correctly matched.

Figure 8:
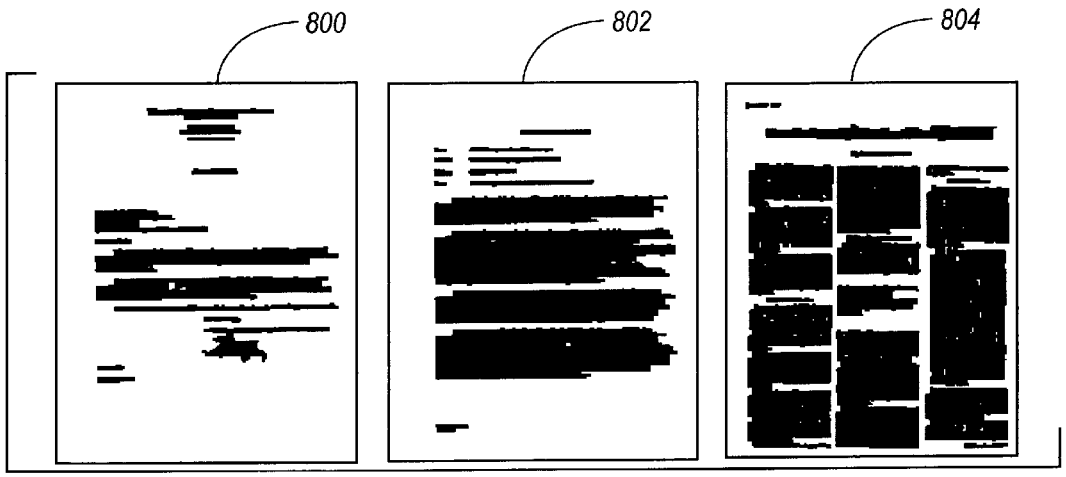
FIG. 8 illustrates examples of three different high level configurations of documents which can be defined by specifying either the absence or presence of attributes and features using the genre model program interface shown in FIG. 7.

FIG. 8 illustrates examples of three different high level configurations of documents which can be defined by specifying either the absence or presence of attributes 240 and features 242 using the genre model program interface shown in FIG. 7. Image 800 shown in FIG. 8 illustrates a genre of document which is typically classified as a letter. In contrast, image 802 is typically classified as a memo, and image 804 is typically classified as an article. As set forth above, the header of a memo tends to be the feature that distinguishes it from a letter. In contrast, the multiple columns typically found in an article tend to distinguish articles from both letters and memos. FIG. 8 illustrates that different genre of document images can be readily identified by specifying the presence and/or absence of specific image attributes and/or features in document images.

F. Searching The Document Corpus

Figure 9:
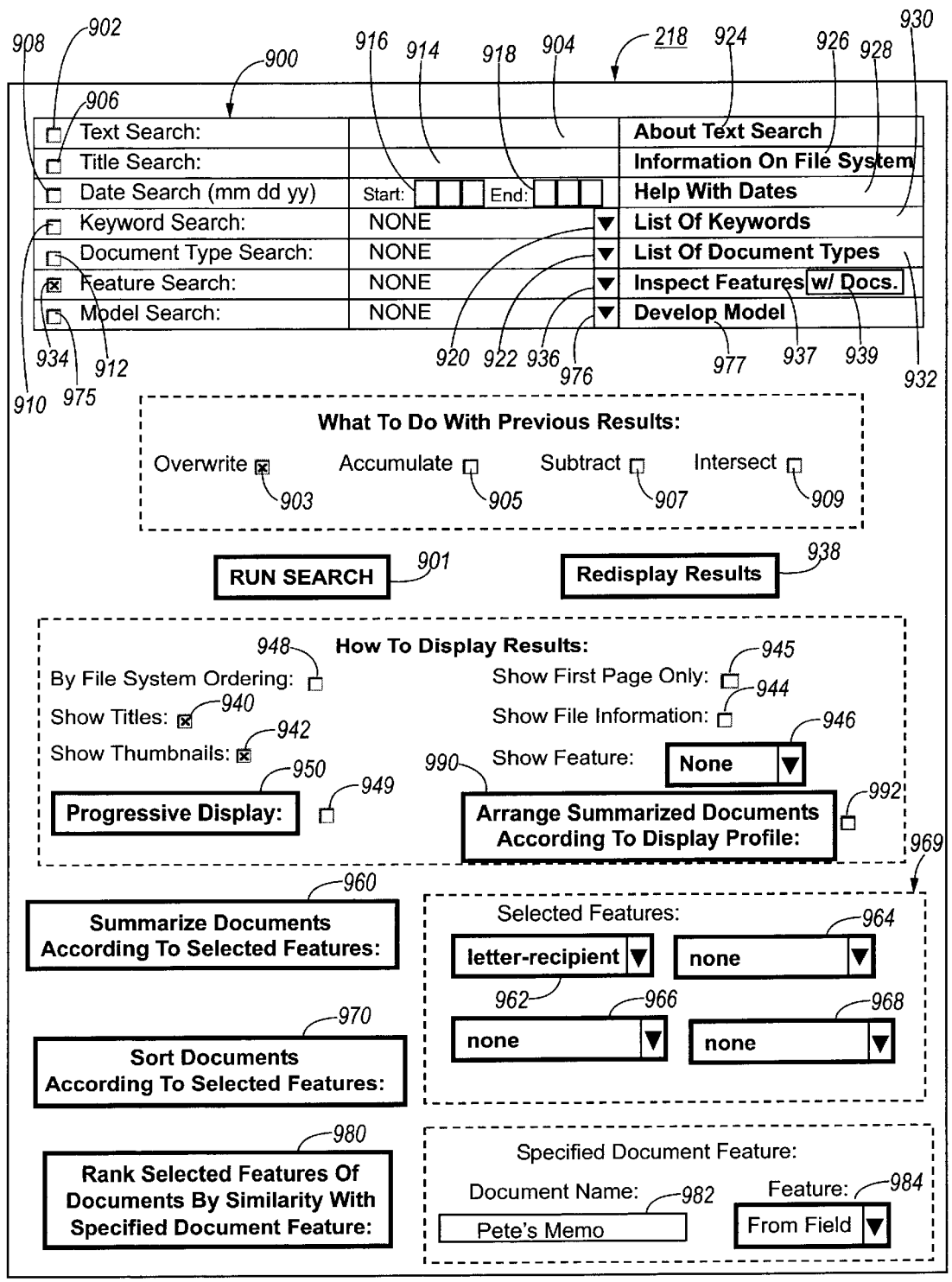
FIG. 9 illustrates an example of a search engine interface for searching the corpus of documents stored in file system.

FIG. 9 illustrates an example of a search engine interface 218 for searching the corpus of document images stored in file system 117. The exemplary search engine interface 218 shown in FIG. 9 provides mechanisms for searching the text 236, the document metadata (i.e., title, date, keyword and type) 224, features 242, and genre models 244 stored in memory file system 117. Either one or a combination of these different classes of searches can be performed by selecting the particular class of search and by specifying the parameters of the class of search in display area 900. Once the class of search and the search parameters are specified, a user selects the "Run search" button 901 to perform the specified search. Results from a subsequent search can be either overwritten by, accumulated with, intersected with, or subtracted from the results of a preceding search by selecting one of the buttons 903, 905, 907, or 909, respectively.

The text database 236 (shown in FIG. 2) is searched by selecting button 902 and filling text display area 904 with text based clues. This search is performed on ASCII characters and can be defined using boolean logic or probabilities, as selected by the user in a preferences window not shown. The document metadata (e.g., type, date, title and keyword database) 224 is searched by selecting one of the buttons 912, 908, 906, and 910, respectively. In addition to specifying the class of search, a user must specify the search parameters that are used to perform each search.

In the case of a title search, a user must input textual information that suggests the title in text display area 914. In the case of a date search, a user can either input an exact date or a range of dates at start period 916 and end period 918. In the case of a keyword search, one of a set of keywords displayed in menu 920 must be selected (the default shown is "none"). Finally, in the case of a document type search, one of a set of document types displayed in a menu 922 must be selected (the default shown is "none"). Help information about the text, tittle, date, keyword, or document type searches can be obtained by a user by selecting the hypertext links 924, 926, 928, 930, or 932, respectively.

To perform a feature search of either attributes 240 or features 242, the user selects button 934 and a feature from menu 936 (the default shown is "none"). As features are added to the set of features 242, the new features are added to features menu 936. In order to better understand what each feature in the features menu is, a user can inspect the definition of each feature using the inspect features button 937 or the inspect features with documents button 939. Using either button 937 or 939 the definition of a feature is displayed as shown for example in FIG. 6. In the case of a feature being examined using the "with documents" (i.e., w/Docs.) button 939, document images accumulated from a prior search are summarized as shown by the thumbnails 604, 606, and 608 in FIG. 6. In addition, a model search can be performed by selecting button 975 and selecting a genre model from menu 976. The menu of genre models 976 includes each of the genre models 244 defined using genre model program interface 219. To review or develop new genre models, hypertext link 977 can be selected to display model program interface 219. Because computation of attributes 240 and features 242 for page images 226 is performed before invoking a search using interface 218, search operations performed using interface 218 do not involve run-time image analysis and have the advantage of being both time and space efficient.

After one of the classes of searches in display area 900 is performed, the results are displayed in the search engine interface 218. In one embodiment, thumbnails satisfying the search are displayed. By selecting one of the displayed thumbnail, the original page image of the thumbnail is displayed for the user to examine in greater detail. In general, the results can be displayed in any manner in which a user specifies. For example, a user can specify that the results are displayed as ordered by the file system 117 using checkbox 948. Also, a user can specify that only the first page of a document is displayed using checkbox 945. In addition, a user can specify that the titles of documents, the thumbnails of documents, the file information, and a selected feature be presented when displaying the results by selecting, checkboxes 940, 942, 944, or an entry in menu 946, respectively. Results of a search can be redisplayed after specifying a new format by selecting "Redisplay" button 938.

G. Summarizing A Document Image and Sets of Document Images

As set forth above, FIG. 3 illustrates an example of a page image 226 (of a document image 237) which is segmented into a plurality of layout objects 238. Features 242 are defined using attributes 240 that quantify each of the layout objects 238. Each feature 242 is defined using a routine that identifies a particular region of the page image with certain properties. For example, the features illustrated in FIG. 3 are routines that are used to identify the regions in a page image which represent the date, signature, recipient, and copy fields of a letter. Each of these features can be defined using either one or more than one "text block" layout objects since layout objects 238 are not purposefully segmented to identify a particular feature of a document. Instead, layout objects represent a type of structural element in the document image that is unrelated to the content of the document image.

Using user-defined features 242, a user can formulate user-crafted summary images for a document image or sets of document images. FIG. 9 illustrates a user interface 218 which can be used to create user-crafted summary images of document images. In one embodiment, a user runs a search using the interface 218 to define a subset of document images. Subsequently, the user creates summary images of the subset of document images identified by the search using a summarize command indicated by reference number 960. The user interface 218 provides the user with at least four different features 242 with which to summarize each document identified by the search at menus 962, 964, 966, and 968. It will be understood by those skilled in art that the number of features need not be limited to four. Instead, the user interface 218 could provide any number of features with which to summarize one or more document images. It will also be appreciated by those skilled in the art that the command button 960 can be selected before searching a corpus of documents thereby summarizing the entire collection of the document images in the corpus. That is, user-crafted summary images can be made for a single document image, a subset of document images, or all of the document images in the file system 117.

Figure 10:
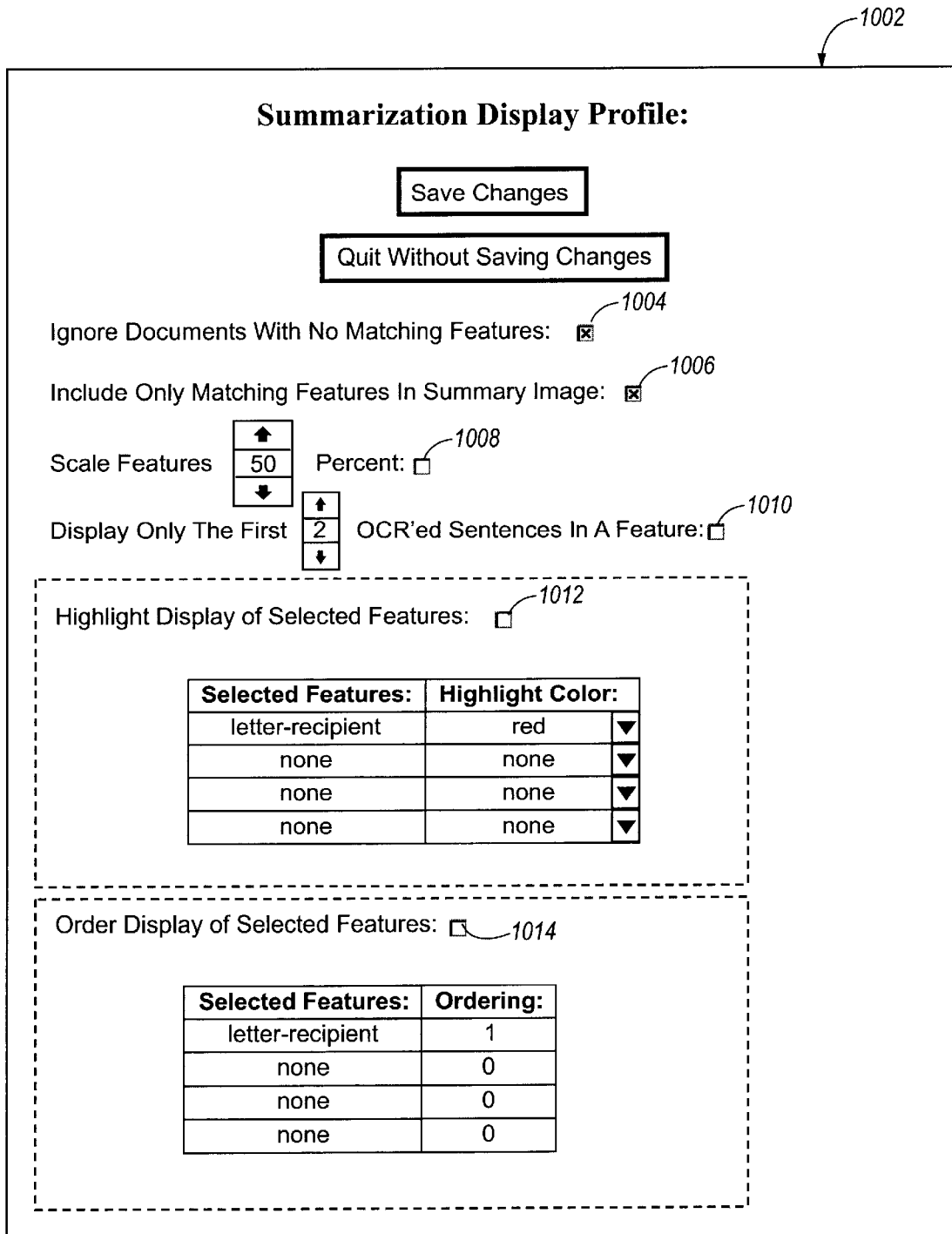
FIG. 10 illustrates a summarization display profile, which can be used to define the output format of a composite summary image of user-crafted summaries.

FIG. 10 illustrates a summarization display profile 1002, which can be used to select one or more user-specified operations for customizing the output format of a composite summary image of user-crafted summary images. The display profile 1002 can be accessed by selecting the button 990 on the interface 218 shown in FIG. 9. Once a summarization display profile is defined, the profile can be activated by selecting checkbox 992; otherwise, when the checkbox 992 is not selected, the system default settings are used to format the user-crafted summary images. More specifically, the summarization display profile 1002 enables the user to customize the output format of a composite summary image representing one or more user-crafted summary images of document images with one or more user-specified operations at checkboxes 1004–1014. By selecting checkbox 1004, a user can request that document images are ignored in the composite summary image if there exists no matching features in the document image. When more than one feature is selected, the user can specify using checkbox 1006 that reference is made only to matching features in the user-crafted summary images.

Summarization display profile 1002 also provides a user with the ability to arrange the layout objects which summarize a feature of a document image by requesting that only an indicated number of OCR'ed sentences are output into a composite summary image by selecting checkbox 1010. In addition, a user can specify that the layout objects of features summarizing a document image are scaled by selecting checkbox 1008. Also in display profile 1002, a user can specify that layout objects of selected summarized features are output to a composite summary image by being highlighted at checkbox 1012. Furthermore, a user can specify an order in which certain layout objects of features are output to a composite summary image at checkbox 1014. It will be understood by those skilled in the art that the options for specifying the output format of a composite summary image that are shown in user summarization display profile 1002 are exemplary and other options can be readily included.

Figure 11:
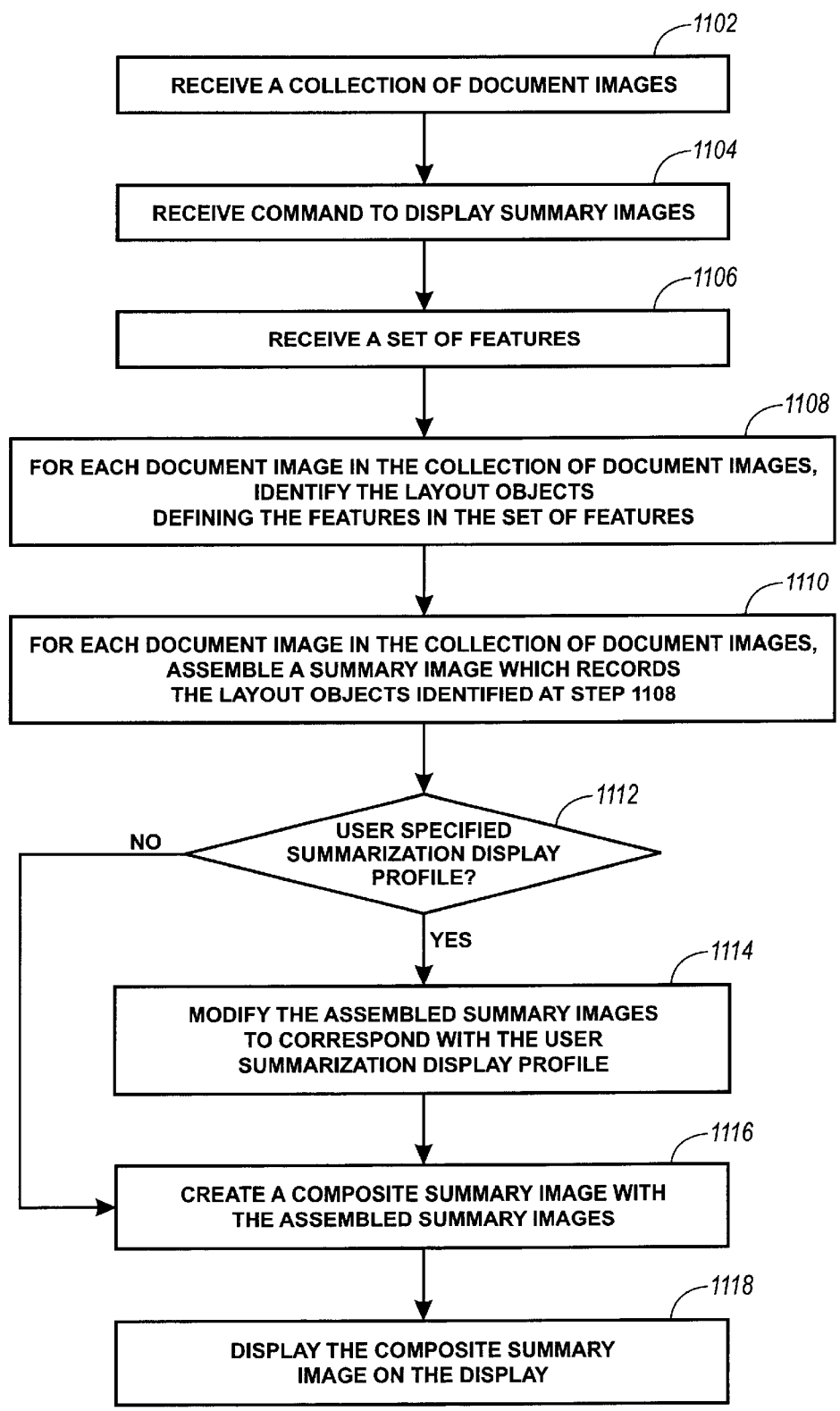
FIG. 11 is a flow diagram which sets forth the steps in for generating user-crafted summaries of searches.

FIG. 11 is a flow diagram which sets forth the steps in which the document corpus search system 140 generates user-crafted summary images of one or more document images. Initially at step 1102, a collection of document images is received. This collection of document images can be defined by performing a search using the search interface 218, for example. Each document image in the collection of document images includes one more page images. Each of these page images is processed at some point by image segmentor 211 and program manager 214 to generate attributes 240 and features 242 therefor. Subsequently at step 1104, a command is received which requests that summary images of the document images received at step 1120 be displayed. In addition to receiving the command at step 1104, a set of features is received at step 1106. These features are selected by a user from a set of predefined features, or by programming a new feature using the method show in FIGS. 4–5. In one embodiment, the command received at step 1104 and the set of features received at step 1106 are received after a user specifies one or more features at menu's 962, 964, 966, or 968 and selects command button 960 shown in FIG. 9.

At step 1108, for each document image in the collection of document images, the system 140 identifies the layout objects defining those features in the set of features received at step 1106. Subsequently at step 1110, for each document image in the collection of document images, a summary image is formed by assembling the layout objects associated with the features identified at step 1108. If at step 1112 a user specifies at checkbox 992 (shown in FIG. 9) that a user summarization display profile is to be used in creating a composite summary image, then step 1114 is performed; otherwise, step 1116 is performed.

At step 1114, the layout objects defining the summary images assembled at step 1110 are modified according to a predefined user-specified operation selected from the user summarization profile defined by the user. More specifically, the particular user-specified operation(s) used to modify the assembled summary images at step 1114 is determined by which of the checkboxes 1004–1014 are selected in summarization display profile 1002. As described above, a user can define a user summarization profile 1002 (shown in FIG. 10) by selecting the button 990 shown in FIG. 9. If no user summarization profile is specified at step 1112, a system default summarization display profile used instead. It will be understood by those skilled in the art that in the event the user summarization display profile is used, further processing of the layout objects in the assembled summary images that is similar to that performed at step 1115 may be necessary.

Modifications performed to assemble summary images at step 1114 are performed depending upon which options are selected in the user summarization display profile 1002 (shown in FIG. 10). For example, two different summary images may be created depending on whether a user selects checkbox 1004 in summarization display profile. When the checkbox 1004 is not selected and none of the selected features are found in a page image, then the document is represented only by its title (which is identified from Document Metadata 224). If, however, the checkbox 1004 is checked then reference to such non-matching document images are entirely omitted from the summary image. That is, when only one feature is specified and a document image does not have that feature, document metadata 224 of that image is not included as part of the summary image for that document image. Furthermore, when checkbox 1106 is selected and more than one feature is selected, only those features that have matching features are identified with a feature title in the summary image (see FIG. 14 for an example).

Figure 12:
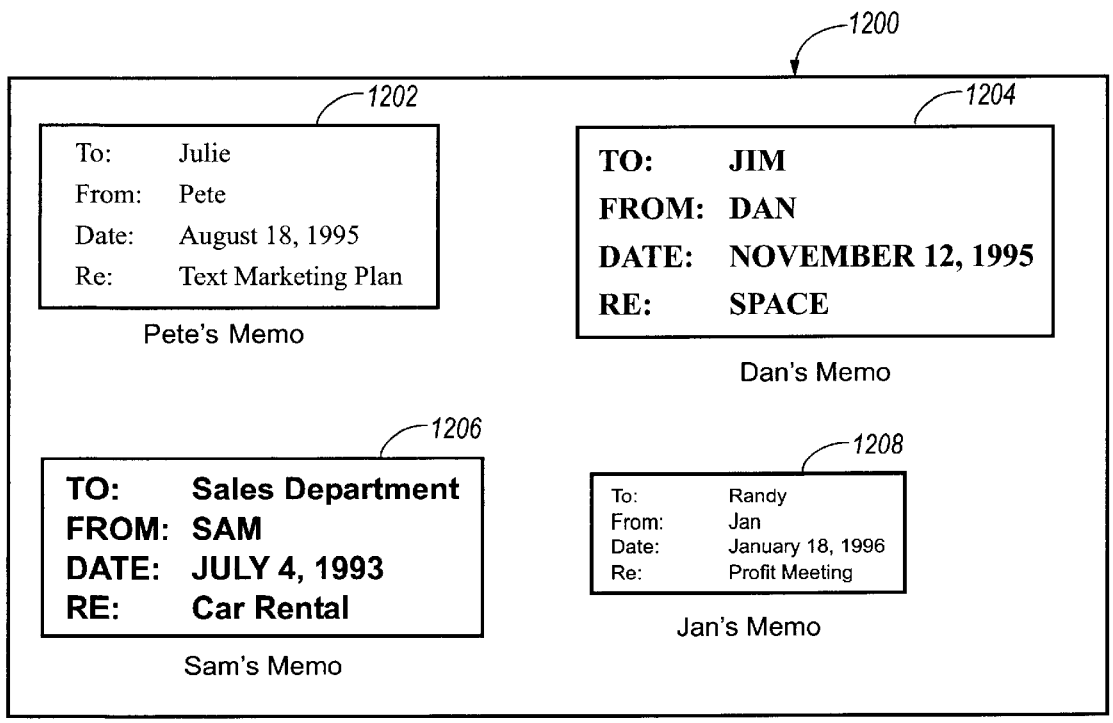
FIGS. 12, 13, and 14 illustrate three different examples of summary images created using the steps outlined in FIG. 10.
Figure 13:
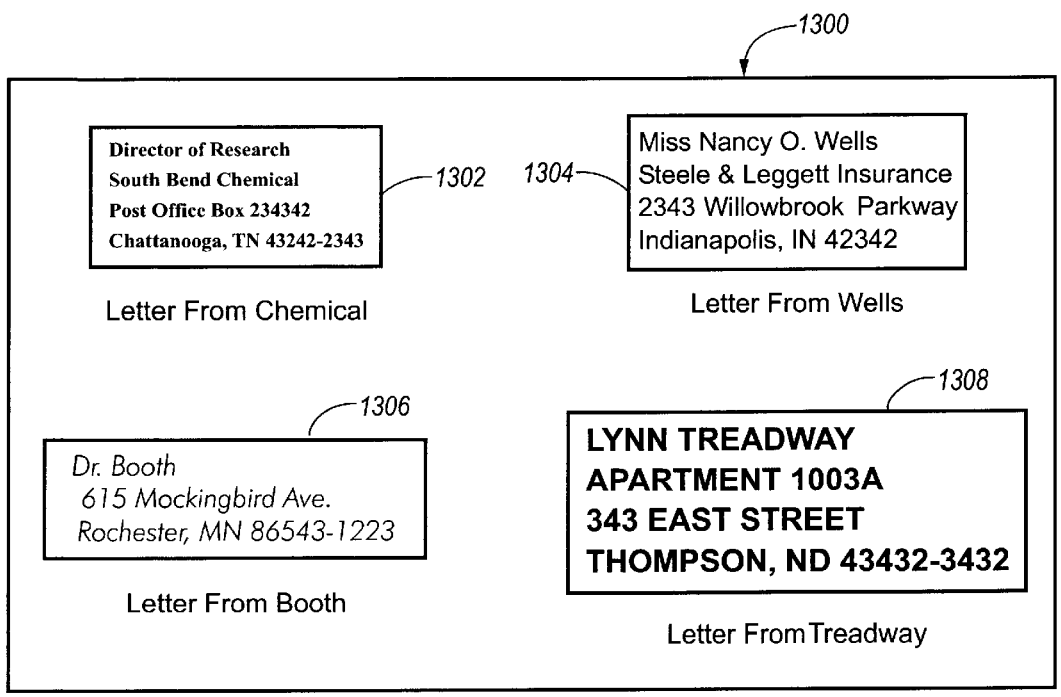
Figure 14:
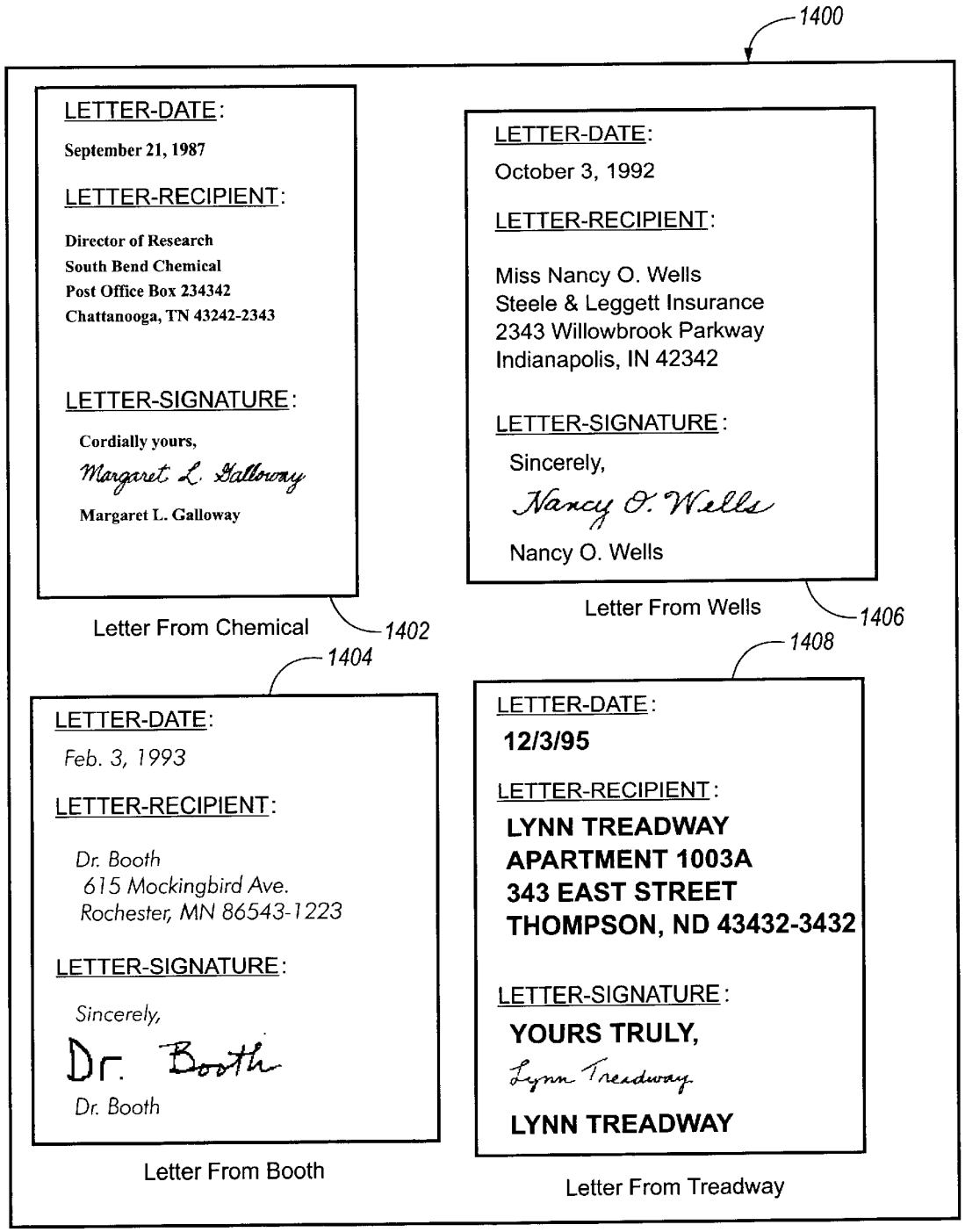

At step 1116, a composite summary image is created using the assembled summary images whether or not modified at step 1114. FIGS. 12, 13, and 14 illustrate three different examples of composite summary images created using the steps outlined in FIG. 11. FIG. 12 illustrates a composite summary image 1200 in which summary images 1202, 1204, 1206, and 1208 include layout objects corresponding to the header field feature (e.g. 4-memo-marks) of four document images. Because only one feature was selected to be summarized in this example, no feature title is provided in each summary image. Below each of the header fields in the composite summary image 1200 is the document title of each document image in which the layout objects corresponding to the feature are located. FIG. 13 illustrates another example in which a composite summary image 1300 includes summary images 1302, 1304, 1306, and 1308 which summarize the recipient field of document images. A further example is illustrated in FIG. 14 in which a composite summary image 1400 includes four summary images 1402, 1404, 1406, and 1408. The summary images 1402, 1404, 1406, and 1408 includes layout objects corresponding to the letter-date, the letter-recipient, and the letter-signature features of four document images. In this example, because three different features were selected a title is provided in each summary image indicating the feature identified.

Finally at step 1118, the composite summary image created at step 1116 is displayed on the user display at step 1118. It will be understood, however, by those skilled in the art that step 1118 could alternatively be performed by outputting the composite summary image to any number of output devices, such as a printer. The advantage of this summarization technique over text based summarization techniques is that this summarization technique is based on a method which defines the relevant content of a document based on functional information implicit in a document's layout, rather than the lexical structure of document text. In addition, this summarization technique advantageously operates at less resolution than is required for OCR programs or word-pattern detection programs to operate. Also, similar to other aspects of this invention, this summarization technique is not required to operate with the use of any OCR analysis on layout objects. For example, the layout objects that define the signature portion of the letter-signature feature 352 (see FIG. 3) are bitmap images without any textual content.

H. Ordering Search Results By Feature or Attribute

In order to help a user identify a document image in a large corpus of document images, a method is provided for sorting search results according to the appearance of document features or attributes. Unlike the summarization of document images set forth in Section G above, the sorting of document images involves image analysis on features to identify similarities therebetween. This method for sorting documents into similar groups of layout objects, groups documents with layout objects having coherent and/or homogenous visual appearances. In operation, a set of documents is sorted by performing image based comparisons of features to determine which features between documents are similar enough that they should be grouped together. These image based comparisons are performed by matching image segments which are automatically extracted from locations that contain the features. One method, set forth in FIGS. 15 and 16, groups similar features together according to a predefined threshold value. Another method, set forth in FIG. 18, ranks features by their order of similarity with a feature from a selected document. Both methods use clustering techniques that compute a distance measurement between the features. The greater the distance measurement, the less likely that two features are similar. Once a set of documents is ranked or grouped into clusters of documents using distance measurements, the set of documents are organized by the sorted clusters to improve searching for a document in the corpus of documents.

Figure 15:
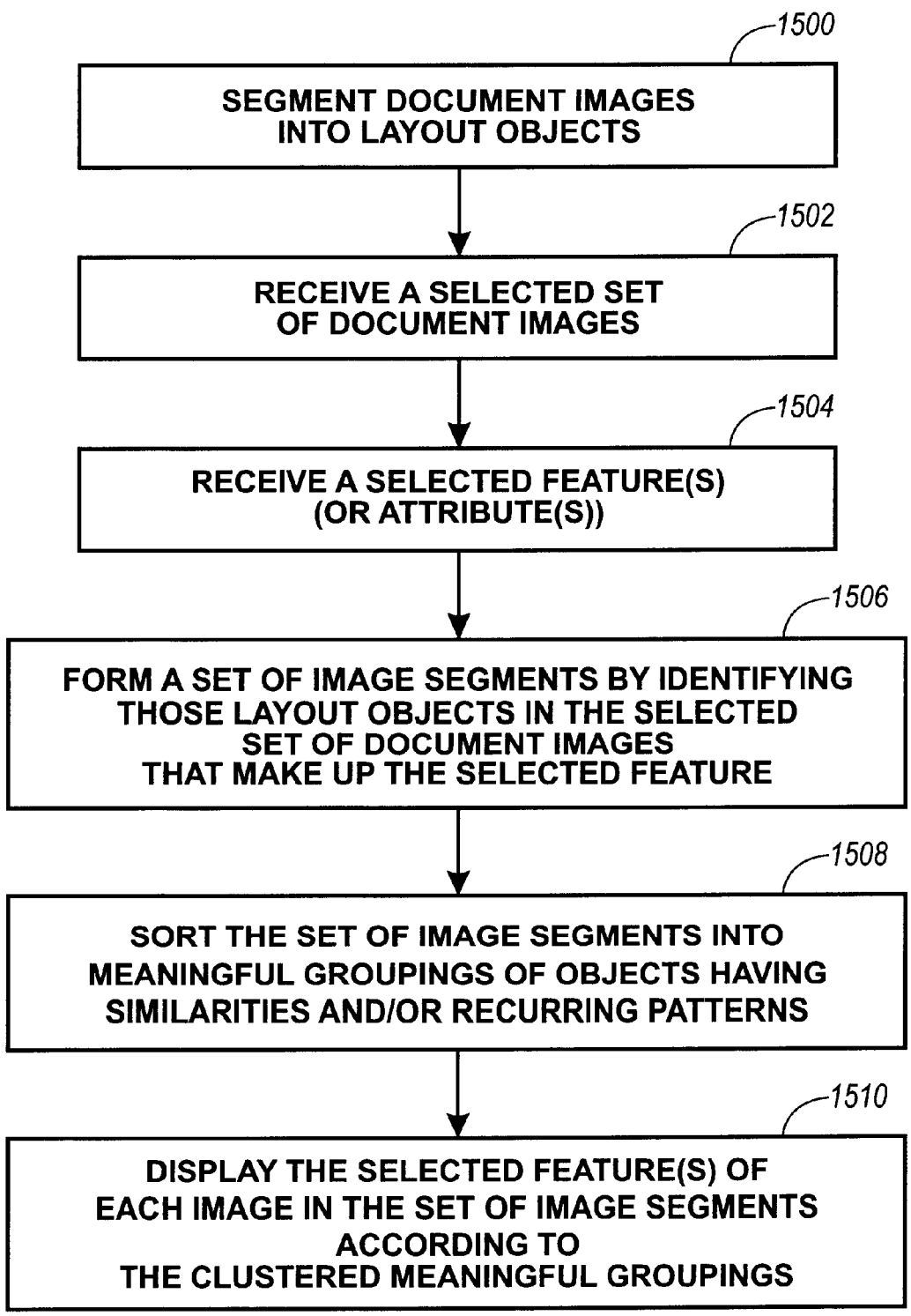
FIG. 15 is a flow diagram which sets forth the steps for sorting document images according to the similarities between layout objects segmented from document images.
Figure 16:
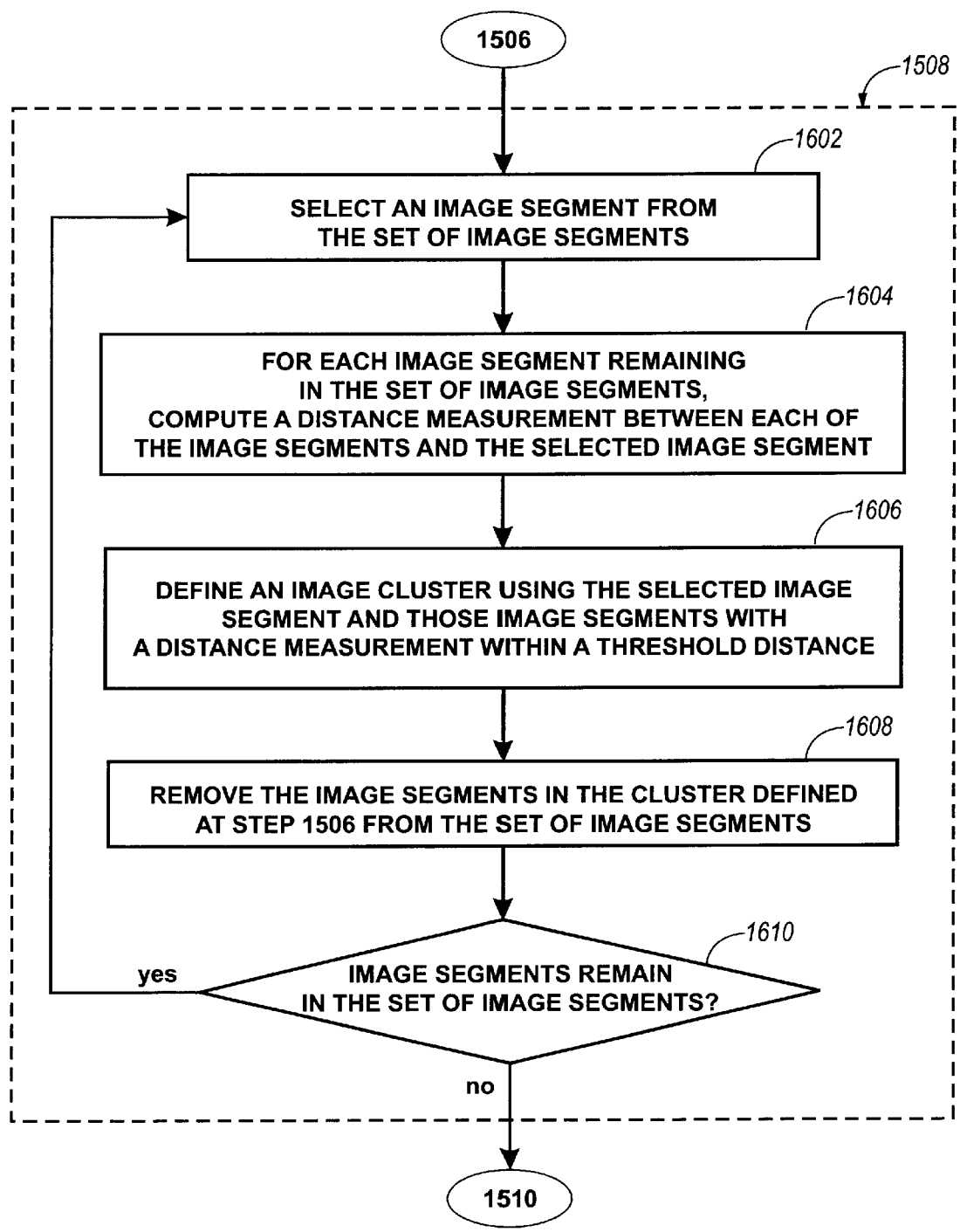
FIG. 16 is a flow diagram which sets forth one embodiment for sorting the set of image segments at step 1508 shown in FIG. 15.
Figure 18:
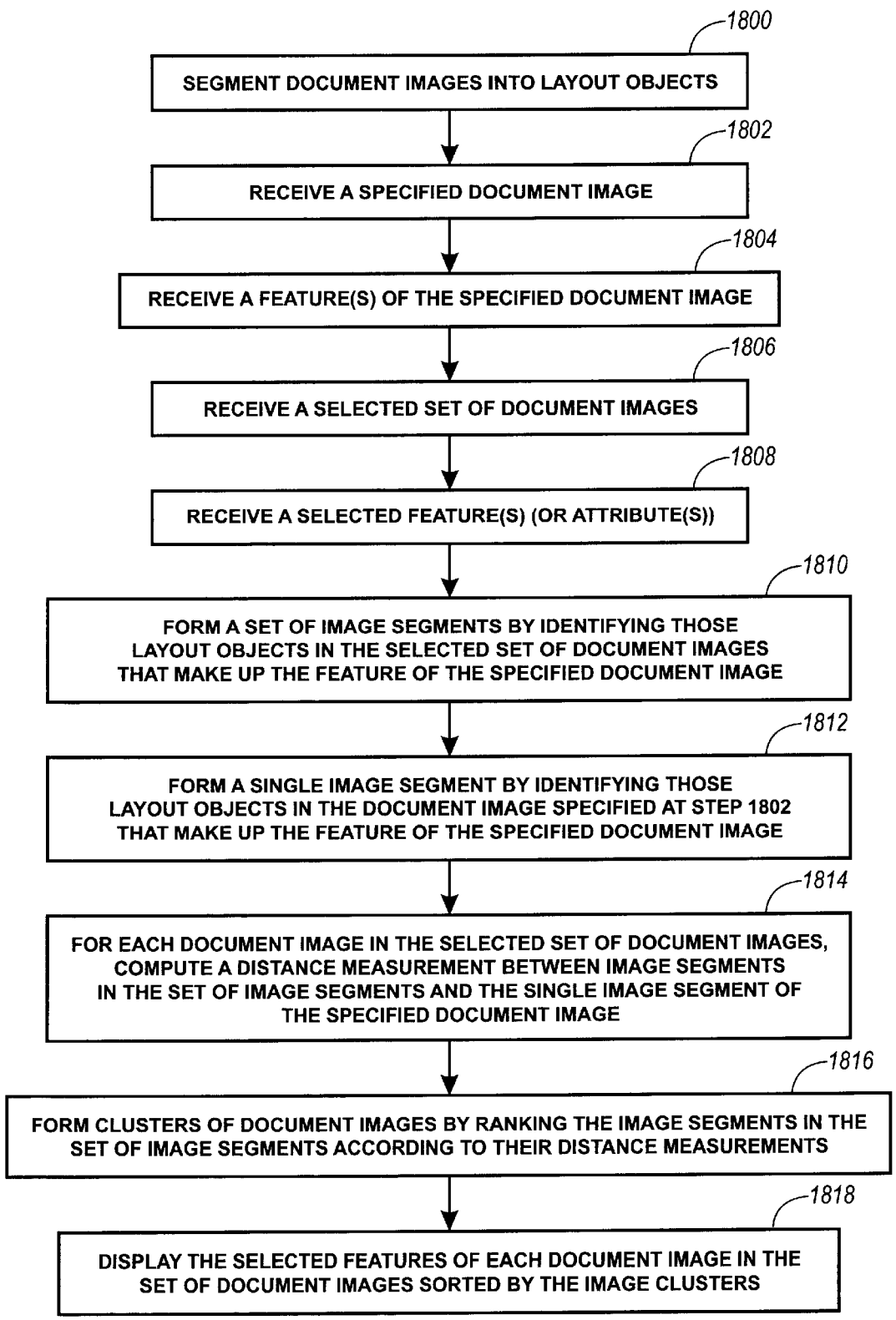
FIG. 18 is a flow diagram which sets forth an embodiment for sorting layout objects segmented from document images by their similarity to a specified layout object.

The methods which are set forth in the flow diagrams in FIGS. 15, 16, and 18 are resident in RAM 116 and executed by processor 114 during operation of the document corpus search system 140 (see FIG. 1). Unlike other methods for sorting documents, these methods are efficient because they only compare portions of document images with each other. Also, these methods advantageously sort document images in the image domain (i.e., not the text domain) based on a segment (or portion) of a document image which is automatically extracted by the system 140. It will be understood by those skilled in the art that either method for comparing document images set forth below can be modified to incorporate certain efficiency considerations. For example, step 1500 in FIG. 15 and step 1800 in FIG. 18 for segmenting the document images into layout objects do not need to be performed in real time. Instead, image segmentation need only occur once before a user invokes a command to sort the corpus of documents by either creating similar groupings of documents or by creating rankings of document images with respect to a single document image.

H.1 Sorting Search Results By Feature or Attribute

FIG. 15 is a flow diagram which sets forth the steps for grouping document images 237 stored in file system 117 according to similarities between layout objects 238 segmented from page images 226 (see FIGS. 2 and 3). Initially at step 1500, page images 226 of document images 237 are segmented by image segmentor 211 into layout objects 238, with each layout object having one of the layout object types set forth in Table 1. In addition at step 1500, the image segmentor and text identifier 211 calculates attributes 240 and may perform OCR to identify ASCII text 236 in the layout objects. Subsequently, program manager 214 evaluates routines of features 242 using the image attributes 240 and layout objects 238. In one embodiment, OCR is only performed on the layout objects that are of interest for a particular search.

At step 1502, a selected set of document images 237 is received by the system 140. This set of document images can either be a predefined set of document images selected by a user, or a set of document images derived from a search performed by a user. At step 1504, one or more selected features or attributes are received from a user. The selected features can either be predefined or selected by a user at menus in display area 969 in user interface 218. For example, FIG. 9 illustrates an instance where a user selects the letter-recipient feature from menu 962. After the user selects command button 970 to sort documents according to the selected feature at step 1504, the selected feature in menu 962 is received at step 1506. In an alternate embodiment, the interface 218 includes menus for selecting features and/or attributes, and not just document features as shown in FIG. 9.

At step 1506, a set of image segments is formed by identifying those layout objects in the selected set of document images that make up the specified feature. In the event an image segment is not in the form of a bitmap image, those image segments that are in a structured document representation, such as a page description language (PDL), are rendered into a bitmap representation by a conventional PDL decomposer or the like. For example, the text-block layout objects that make up the letter-recipient feature 354 of the page image 226 shown in FIG. 3 may define one image segment in the set of image segments computed at step 1506 for page image 226. However in some instances, an image segment may consist of one or more layout objects (e.g., in FIG. 6, the image segment for the memo header 640 consists of separate layout objects which define the memo marks 642). Subsequently at step 1508, the set of image segments formed at step 1506 is sorted into meaningful groupings of objects having similarities and/or recurring patterns. Finally at step 1510, the document images, or their reduced scale images, that correspond to each image segment in the set of image segments are displayed to a user on display 132 according to the meaningful groupings which are sorted at step 1508.

More specifically at step 1508, coherent or homogenous patterns between the bitmap image segments are identified. Depending on the degree of similarity between two image segments, the image segments are sorted into similar or dissimilar groups of image segments. Patterns between two bitmap images that are similar may, for example, be caused by the use of similar font styles or similar font sizes. When two bitmap segments are analyzed their shapes are classified as belonging to the same meaningful group if the measurement of their similarity falls within some predefined threshold value. Once sorting is performed by analyzing image segments in the image domain (i.e., non-textual domain), sorting can be performed on segments of text (computed by text identifier 211) to identify image segments with similar textual meaning. The textual meaning of an image segment, for example, may help identify a particular class of subjects or sub-class of subjects.

FIG. 16 is a flow diagram which sets forth step 1508 in FIG. 15 in greater detail. More specifically, FIG. 16 is one embodiment for sorting image segments having similarities and/or recurring patterns into meaningful groupings. Initially at step 1602, an image segment is selected from the set of image segments formed at step 1506. At step 1604, distance measurements are computed between each of the image segments remaining in the set of image segments and the selected image segment. Each distance measurement quantifies the similarity between each of the remaining image segments in the set of image segments with respect to the selected image segment. These distance measurement between image segments can be performed on a global or local basis. If performed on a local basis, the distance measurement between two image segments is computed for only a portion of each image segment. For example, two image segments which record entire lines of text can be matched to one another on a global line by line basis or on a local word by word or character by character basis.

In one embodiment, each distance measurement is determined by computing a "Hausdorff distance" between each of the remaining image segments and the selected image segment. In alternate embodiments, each distance measurement is determined by computing a "Hausdorff fraction" or a "minimum Hausdorff distance under Transformation." Details for computing a Hausdorff distance, a Hausdorff fraction, or the minimum Hausdorff distance under Transformation is disclosed in U.S. patent application Ser. No. 08/633,240, entitled "Fast Techniques for Searching Images Using the Hausdorff Distance," which is incorporated herein by reference. These methods are also disclosed in "Efficient Visual Recognition Using the Hausdorff Distance," by William Rucklidge, published by Springer-Verlag, 1996, which is incorporated herein by reference. In other embodiments, the distance measurement can be determined by computing a weighted XOR or a Hamming Distance between two image patterns. Yet another embodiment for computing a distance measurement is disclosed in U.S. Pat. No. 5,539,841 which sets forth a method for comparing image sections to determine the similarity therebetween.

An advantage for determining each distance measurement by computing the minimum Hausdorff distance under transformation, is that small changes in scale and orientation between image segments are taken into account in computing each distance measurement. That is, the differences between two image segments resulting from changes in scale or orientation are accounted for by computing a distance measurement with the minimum distance under transformation method. For example, a change in scale may identify two image segments with similar type face (e.g., Times Roman) but a different font sizes (e.g., ten point and twelve point). In effect, this method identifies image segments with similar attributes by identifying the transformation that produces the best Hausdorff distance measurement between two image segments. Consequently, image deformations due to scale and orientation are taken into account when the distance measurement between the two image segments is computed.

After determining the similarity between the selected image segment and each image segment remaining in the set of image segments, a cluster of image segments is defined at step 1606. Specifically, the image segments which remain in the set of image segments which have distance measurements within a threshold distance are used to define a new cluster of image segments. Those image segments that form the cluster at step 1606 are removed from the set of image segments at step 1608. If image segments remain in the set of image segments at step 1610, then step 1602 is repeated; otherwise, step 1510 is performed. At step 1510, document images that correspond to each of the image segments formed at step 1506 are arranged according each of the image clusters defined at step 1606.

An alternate embodiment for sorting a set of image segments into meaningful groupings, at step 1508, is disclosed in U.S. Pat. No. 5,835,638, entitled "Method And Apparatus For Comparing Symbols Extracted From Binary Images Of Text" (hereinafter patent application '638), which is incorporated herein by reference. In this alternate embodiment, a Hausdorff-like method is used for comparing image segments to identify meaningful groupings of image segments. In performing the method set forth in patent '638 at step 1508, the following two distinctions in terminology should be taken into account. First, "symbols" extracted in patent application '638 are defined in the context of the present invention as image segments that are made up of one or more layout objects. Second, "equivalence classes" created in patent application '638 are defined in the context of the present invention as meaningful groupings.

Figure 17:
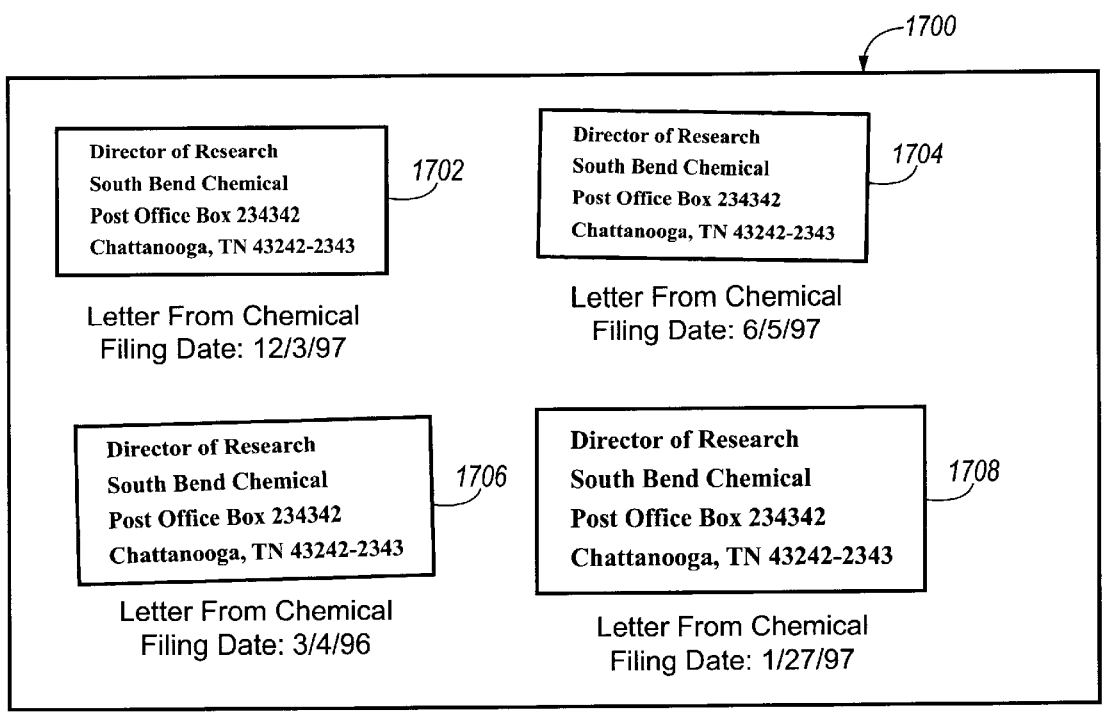
FIG. 17 illustrates a grouping of image segments that is formed using the method set forth in FIGS. 15 and 16.

FIG. 17 illustrates a grouping of image segments 1700 that is formed using the method set forth in FIGS. 15 and 16. Each image segment in the grouping of image segments 1700 includes title and filing date information from document metadata 224. Also, each of the address fields in grouping 1700 is a hypertext link to its corresponding document image. Once the document images in the system are segmented into layout objects at step 1500, a set of document images is identified at step 1502, and the address field feature is selected at step 1504, by a user. The grouping of image segments 1700 is just one grouping of many groupings sorted at step 1508 after forming a set of image segments at step 1506. In the grouping of image segments 1700 there are four address fields 1702, 1704, 1706, and 1708. The address fields are grouped together because their distance measurements are under some threshold value. In addition, this method for grouping the address fields takes into account variations between the image segments caused by scaling and orientation. For example, the scaling of address fields 1702 and 1708 are different, whereas the orientation of the address fields 1704 and 1706 are different. By using this method for sorting documents stored in a corpus of documents, a user is able to more readily identify a particular document in the corpus by examining the grouping of documents 1700 which have similar address fields.

H.2 Ranking Search Results By Feature or Attribute

FIG. 18 is a flow diagram which sets forth the steps for ranking layout objects 238 segmented from the document images 226 stored in file system 117 by their similarity with a selected layout object. The layout objects in a page image of a document image are identified using either a feature 242 or an attribute 240 of a document image. Initially at step 1800, the page images 226 of document images 237 are segmented into layout objects 238 as described above for step 1500 in FIG. 15. At step 1802, a specified document image is received. Also, a feature(s) of the specified document image is received at step 1804. Alternatively, instead of image features, an attribute(s) 240 can be received at step 1804. In one embodiment, the document image and its feature(s) are specified using the document search interface 218, which is shown in FIG. 9. In this embodiment, the document name is specified in text field 982 and the feature is specified in menu 984. At step 1806, a set of document images is selected. This selected set of images can either be a predefined set of document images or a set of document images derived from a search using search interface 218. At step 1808, one or more selected features or attributes are received. In the embodiment shown in FIG. 9, the features selected at step 1808 are specified using one of the feature menus 962, 964, 966, and/or 968 in display area 969. Each of the elements received at steps 1802, 1804, 1806, and 1808 are received once a user selects the command button 980 in interface 218.

At step 1810, a set of image segments is formed by identifying those layout objects in the selected set of document images (at step 1806) that make up the feature of the specified document image (at step 1804). That is, only certain portions (i.e., layout objects) of a document image that corresponds to the feature of the specified document image are extracted from those document images and added to the set of layout images. At step 1812, a single image segment is formed by identifying those layout objects in the document image specified at step 1802 that make up the feature specified at step 1804. At step 1814, a distance measurement is computed for each document image in the selected set of document images. Each distance measurement computed at step 1814 is a measure of the difference (or similarity) between the feature of a document image in the selected set of document images and the feature of the specified document image. In other words, each distance measurement is a measure of the difference between each image segment in the set of image segments formed at step 1810 and the single image segment formed at step 1812.

Each distance measurement computed at step 1814 can be performed using one of the distance measurements set forth above. For example, each distance measurement can be performed by computing the Hausdorff distance between two image segments. Alternatively, the distance between two image segments can be computed using a Hausdorff fraction, a minimum Hausdorff distance under Transformation, a weighted XOR, or a Hamming Distance. Upon completion of step 1814, each image in the selected set of document images has a computed distance measurement which defines the relatedness of the feature in the document image specified at step 1802 to the same feature in the document images selected at step 1806. At step 1816, clusters of document images are formed by ranking their distance measurements computed at step 1814. At step 1818, the features selected at step 1808 of each document image in the selected set of document images are displayed according to the clusters of features which have been ranked by similarity to the feature of the selected image at step 1816.

Figure 19:
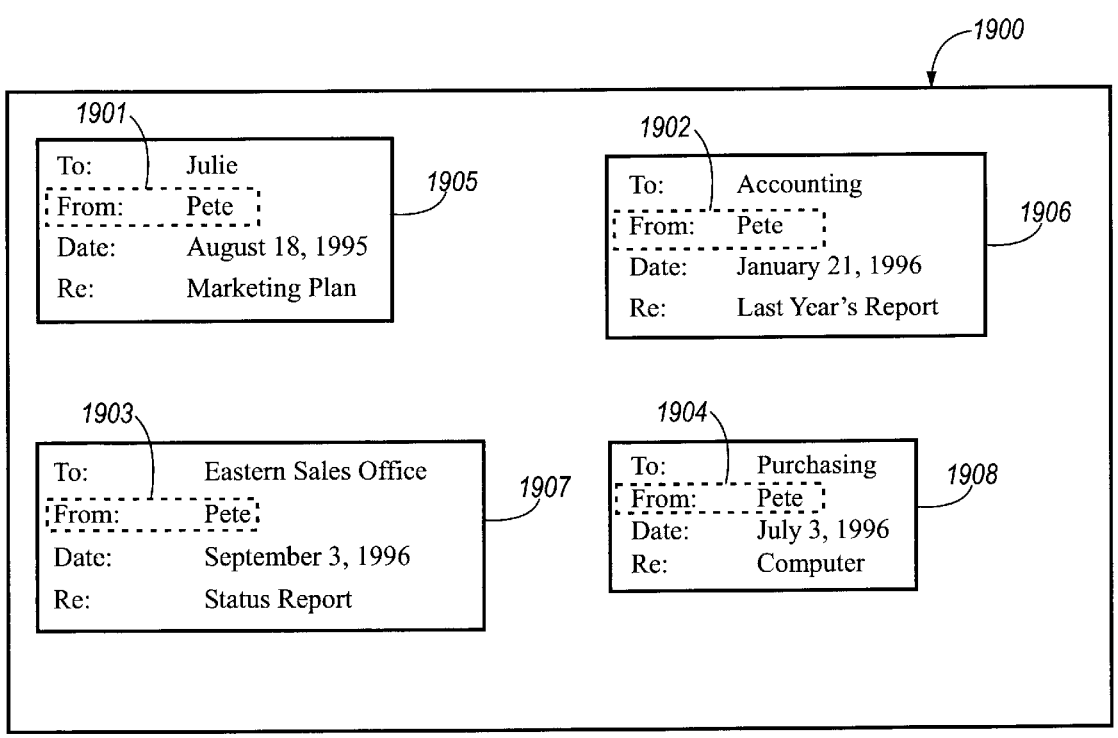
FIG. 19 illustrates an example in which features of document images are sorted according to the similarity of a feature in a specified document image.

FIG. 19 illustrates an example in which features of documents are ranked according to the similarity of a feature in a specified document image. Specifically, FIG. 19 illustrates a cluster of image features 1900 displayed after completing the steps set forth in FIG. 18. In this example, the selected feature of the specified document image is the "from field" which is indicated in the cluster 1900 by reference numbers 1901–1904. In addition, the cluster of image features 1900 illustrates four memo header fields indicated by reference numbers 1905–1908, which correspond to the selected feature at step 1808. More specifically, the "from field" features 1901–1904 have computed distance measurements that are within a specified ranking, that they could be clustered together at step 1816. In accordance with the invention, the cluster of image features 1900 of document images are assembled using the layout structure of document images and not the textual content of document images.

I. Progressive Transmission and/or Display

As set forth above in FIGS. 1 and 2, the image segmentor 211 segments images into layout objects, with each layout object having one of the layout object types set forth in Table 1. Each layout object in a document is identified independent of the content of the layout object. Examples of layout object types are text, graphics, and halftone. As set forth above, image attributes, which are computed for each layout object, are used to define the structure and properties of each layout object. In addition, image attributes are used to identify spatial relationships that a layout object has with other layout objects in page images of a document image. Using image attributes, a user can derive features of a document image. Features unlike attributes can be customized so that they identify a unique set of layout objects in a page image.

Document images 237 stored in file system 117 can be searched over network 130 using search engine interface 218. Because bandwidth on network 117 may be limited, transmission of a document's page images 226 may be slow. Depending on the size of a document image data file and the data transmission rates of the network, a user operating the interface 218 may encounter unreasonably long transmission delays while searching or browsing document images on file system 117. To mitigate unreasonably long delays in receiving document images over network 130, a user is given the option to have layout objects of document image progressively transmitted and/or displayed.

Advantageously, progressive transmission and/or display of document images reduce time costs in transmitting data over network 130 between a client workstation 150, operating the user interface 218, and a server workstation 110, operating the document search and retrieval system 140. In operation, layout objects in page images of a document image that are identified to be more significant than other layout objects are transmitted first. Time costs in transmitting data are lowered because a user is able to gain faster access to those elements of a document image that are of interest. In addition, this form of progressive transmission enables a user to quickly determine whether a document image should be examined in greater detail, thereby minimizing the quantity of data transmitted when a determination not to view a document image is made before those less significant layout objects in the document are transmitted.

In general, this method of progressive transmission and/or display of document images is predicated on having document images segmented into layout objects. Initially, users identify those features or attributes of a document image that are most relevant to their browsing and/or searching interests. This method of progressive transmission and/or display of layout objects is divided into two stages. During the first stage of transmission, only those layout objects of a document image that have the features and/or attributes specified by a user to be of greatest interest are transmitted and/or displayed at a high resolution; remaining layout objects of the document image are transmitted and/or displayed at a low resolution. During the second stage of transmission, which is only invoked if a user requests it, those layout objects transmitted during the first stage at a low resolution are re-transmitted and/or displayed at the high resolution to complete the display the document image at the high resolution.

I.1 Progressive Transmission

Figure 20:
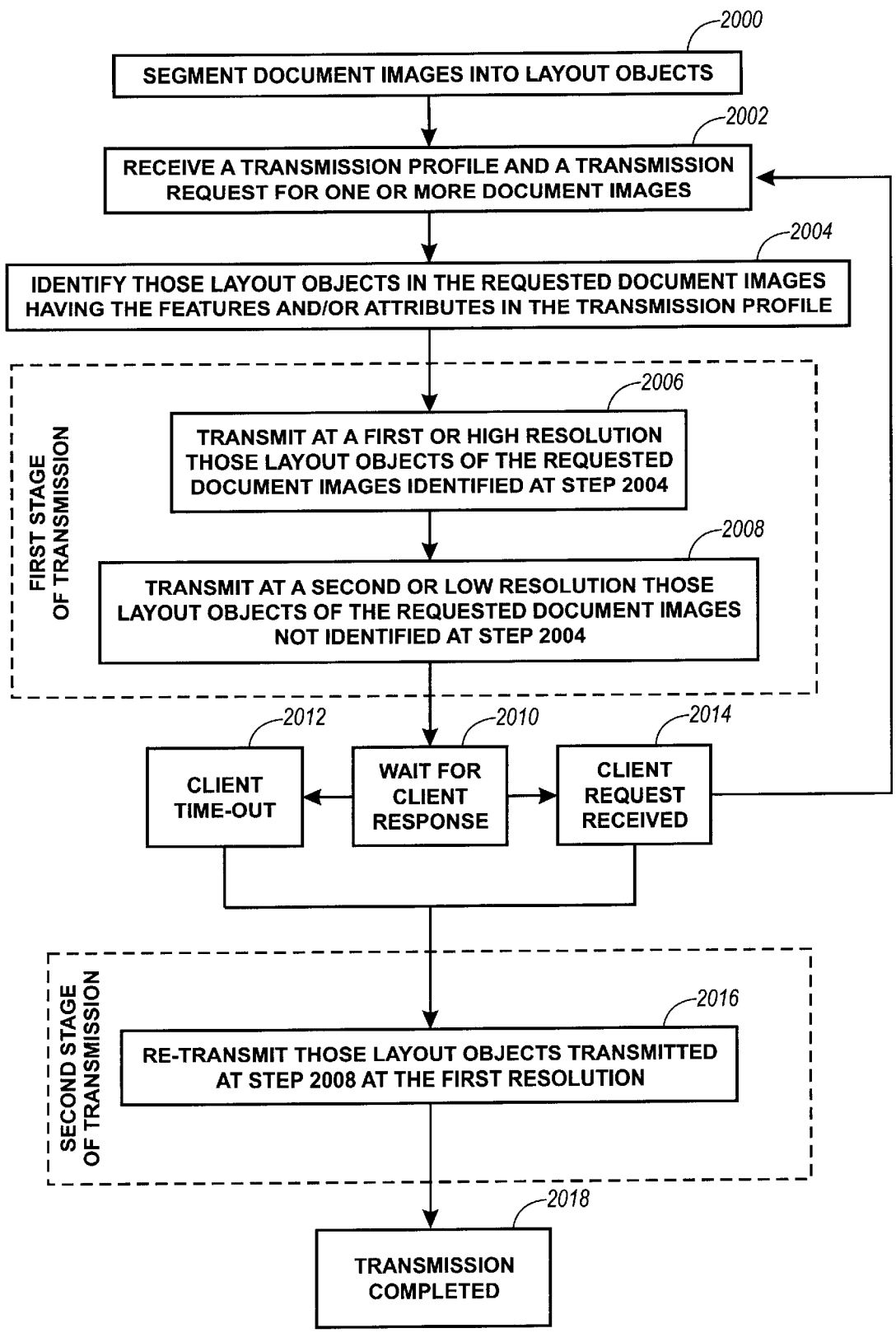
FIG. 20 is a flow diagram setting forth the steps for performing progressive transmission of document images from the perspective of a server workstation running the document search and retrieval system.

FIG. 20 is a flow diagram which sets forth the steps for performing progressive transmission of document images from the perspective of a server workstation running the document search and retrieval system 140. Initially at step 2000, page images of document images 237 in the file system 117 are segmented layout objects 238. Once document images are segmented into layout objects, image segmentor 211 computes image attributes 240 for each segmented layout object. Also, program manager 214 determines whether the layout objects segmented in the document images correspond to features 242. These operations may be performed in real time before transmission of document images. Alternatively, these operations may be performed at system initialization or as document images 237 are added to the file system 117.

In one embodiment, a user at a client workstation 150 (shown in FIG. 1) operating the search engine interface 218 requests that image data is transmitted progressively by selecting check box 949 in interface 218 in FIG. 9. In addition to selecting check box 949, a user can define a display profile 2102 shown in FIG. 21 in which a user can define the order in which features and attributes of a page image are to be transmitted and/or displayed. The display profile 2102 can be accessed by selecting the "Progressive Display" hypertext 950 in interface 218. Display area 2112 in the display profile 2102 allows users to specify those features and attributes which are most relevant to their browsing or searching interests. In addition, users can also specify a ranking for those selected features and/or attributes. In the event the display profile is not defined by a user, a default profile is used in its place. In an alternate embodiment, step 2002 can be performed without user intervention when the client workstation is programmed to automatically transmit and display data progressively.

Figure 21:
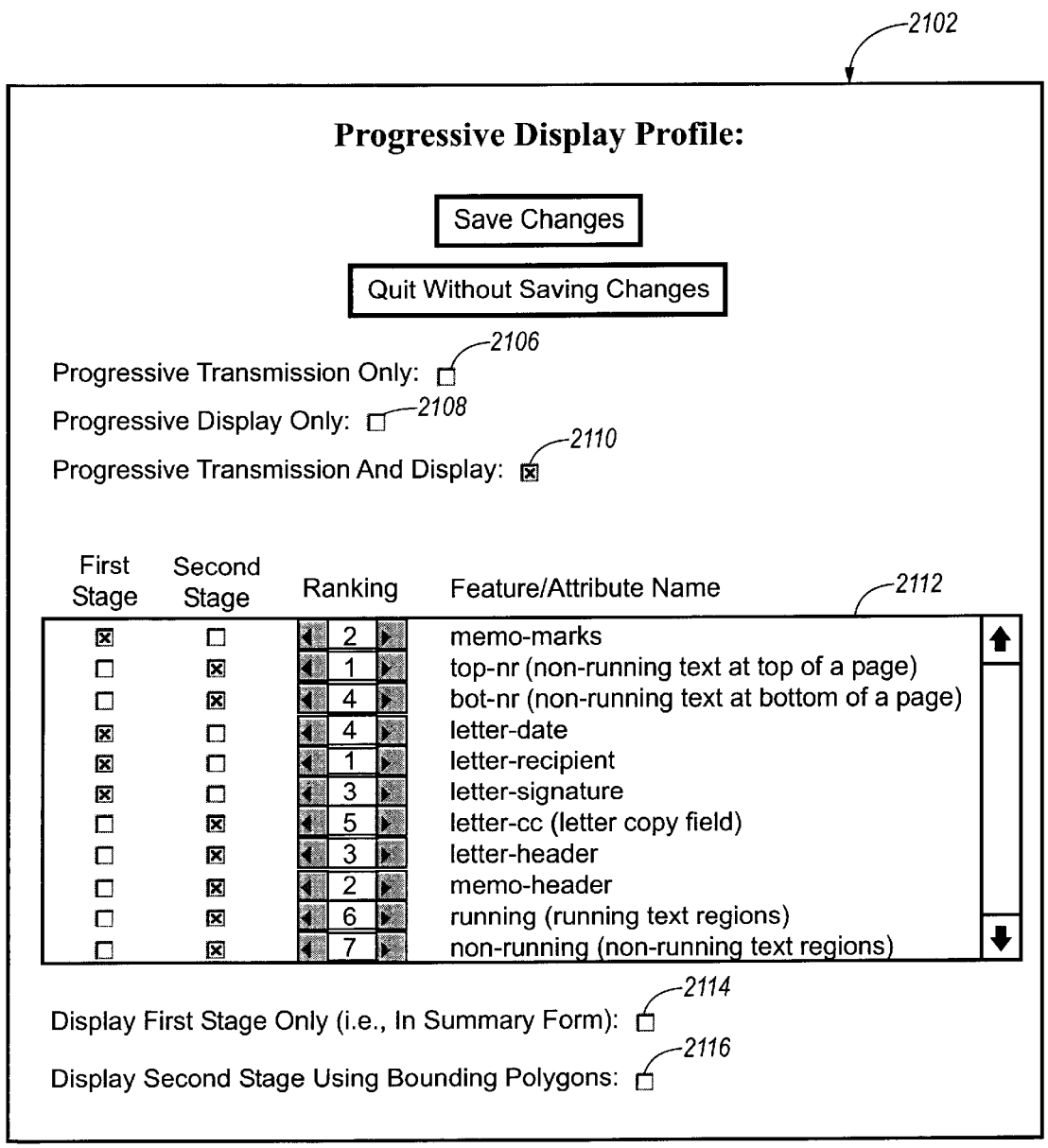
FIG. 21 illustrates a progressive display profile for defining the order in which features and attributes of a document image are to be transmitted and/or displayed.

At step 2002, a transmission profile and a transmission request is received at a server workstation, such as workstation 110 shown in FIG. 1. The transmission request includes a request for one or more document images 237 stored on file system 117. The transmission profile, which is derived from the progressive display profile 2102 set forth in FIG. 21, is a list of features and/or attributes that are used to identify those layout objects in the requested document images to transmit to the client workstation during the first stage of transmission. Using the transmission profile, the server workstation operating the document search system 140 identifies, at step 2004, those layout objects in the requested page images that correspond to the features and/or attributes identified in the transmission profile.

Progressive transmission of document image data is performed in two stages. During the first stage of transmission, steps 2006 and 2008 are executed. At step 2006, those layout objects in the requested page images identified at step 2004 are transmitted to the client workstation at a first or high resolution. Subsequently at step 2008, those layout objects in the requested page images that were not identified at step 2004 are transmitted to the client workstation at a second or low resolution. Upon receipt of the image data, the client workstation formats the transmitted image data to replicate the original document image. In an alternate embodiment, those layout objects transmitted at step 2008 are transmitted in the form of bounding polygons by selecting checkbox 2116 in the progressive display profile 2102 in FIG. 21.

After completing the first stage of transmission, the server workstation waits for a period of time at step 2010. If a client request is not received within the waiting period at step 2014, then the server workstation times out at step 2012. The client request received at step 2014 can either specify that the current transmission request continue or that a new transmission request begin. Specifically, the request received at step 2014 may specify that those layout objects in the requested page images not identified at step 2004 be transmitted at the first or higher resolution during a second stage of transmission; alternatively, the request may specify a new transmission request at step 2002.

In the event step 2002 is repeated, the second stage of transmission is never performed, thereby reducing time costs of transmitting data between client and server workstations. Also, when step 2002 is repeated by a client workstation during a transmission session (i.e., a transmission session may have one or more transmission requests), it will be understood by those skilled in the art that the transmission profile need only be transmitted once per session. In the event that the client times out at step 2012, those layout objects transmitted at step 2008 are retransmitted at step 2016 during the second stage of transmission. Subsequent to executing step 2016, transmission of the requested page images at step 2002 completes at step 2018.

At the client workstation operating search interface 218, the sequence of steps 2014 and 2016 can be initiated, for example, when a user selects a portion of the low resolution (or second resolution) areas of the requested page images. Alternatively, the sequence of steps 2014 and 2002 can be initiated when a user selects a page image (or a reduced scale image of the page image) not in the original transmission request. In contrast when the step 2012 is executed, absent a client request, it is assumed that the user is expecting that the second stage of transmission of the requested page images be automatically initiated. In other words, the absence of a client request after a certain time period time is treated as though a request to begin the second stage of transmission at step 2016 had been received.

It will be appreciated by those skilled in the art that document image data defining layout objects initially transmitted at step 2006 at a low resolution need not be completely re-transmitted at step 2016 at a higher resolution. Instead, layout objects transmitted in two stages can be transmitted using a two-level pyramidal hierarchical encoding scheme whereby part of the data is transmitted during the first stage and the other part of the data is transmitted during the second stage. Data that is hierarchically encoded insures that no redundant data is transmitted between client and server. For example, U.S. Pat. No. 5,335,088 and its references disclose different methods for hierarchically encoding image data. In addition, it will be appreciated by those skilled in the art that depending on the type of image data forming each layout object, there exists an number of compression techniques for reducing the quantity of data transmitted during each stage of transmission.

I.2 Progressive Display

Display of a document image at a client workstation is inherently progressive if the document image is being progressively transmitted using the method set forth in FIG. 20. Progressive transmission and progressive display of document images may be performed either independent of or concurrent with each other as illustrated in display profile 2102 by boolean checkboxes 2106, 2108, and 2110. In one mode of operation, a user at a client workstation can request that page images are displayed progressively and not transmitted progressively by selecting checkbox 2108. Depending on the client workstation, a performance advantage may or may not result when page images are progressively displayed and not transmitted.

Similar to progressive transmission, progressive display requires that a user identify a set of features and/or attributes that are to be displayed during a first stage. These attributes and/or features of a document are those layout objects of a document image that the user would like to be initially displayed. Also, similar to progressive transmission, document images are progressively displayed in two stages. During a first stage of display, those layout objects in a document that are identified by a user are displayed at a first or high resolution. Other layout objects in the document image are displayed at a second or lower resolution. During the second stage of display, those layout objects displayed at the second or lower resolution are subsequently displayed at the higher or first resolution.

I.3 Alternate Modes Of Progressive Transmission and/or Display

The progressive display profile in FIG. 21 provides different options in which to progressively display and/or transmit document image data. It will be appreciated by those skilled in the art that even though only two stages of display and transmission are shown, this method for progressive transmission and display may include any number of display and/or transmission stages. For example, a progressive display profile could offer a user the ability to define four stages of progressive transmission and only two stages of progressive display. What is significant about this method of progressive transmission and/or display of document images is that a user is able to rank the order in which image attributes and/or features of a document are to be transmitted and/or displayed.

In another mode of operation set forth in the progressive display profile 2102, a user can specify that only the first stage of transmission be displayed and/or transmitted by selecting checkbox 2114. By selecting this mode of operation, the content of document images displayed and/or transmitted is in a summary form as shown for example in FIGS. 12–14. This option may be used when a display of a client workstation has limited screen space. A user can also specify that only bounding polygons are transmitted during the second stage of display or transmission by selecting checkbox 2116. Both checkbox options 2114 and 2116 provide two different methods for limiting the amount of image data transmitted and/or displayed during the second stage of operation. In yet another mode of operation, the progressive display profile 2102 provides a user with the option of ranking the order in which features are displayed and/or transmitted within a stage of transmission.

I.4 Examples of Progressively Displayed Images

Figure 22:
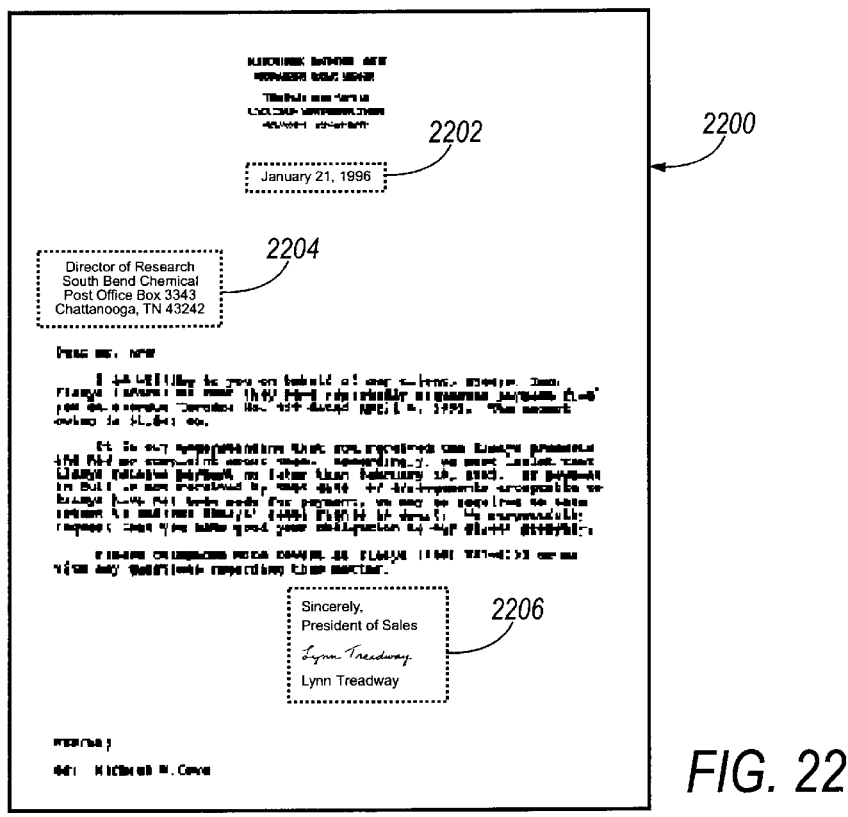
FIG. 22 illustrates an example page image after completing the first stage where selected features letter-date, letter-recipient, and letter-signature are displayed at a high or first resolution.
Figure 23:
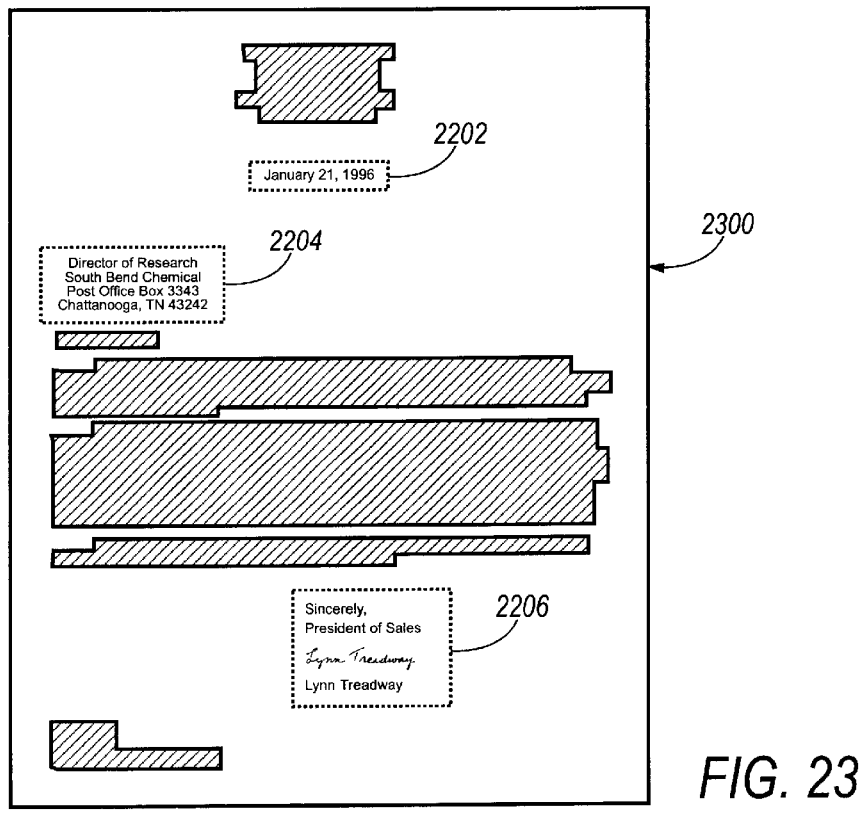
FIG. 23 illustrates a page image after completing the first stage where layout objects which do not have the selected features are displayed using bounding polygons, unlike FIG. 22 where the same features are displayed at a second or low resolution.
Figure 24:
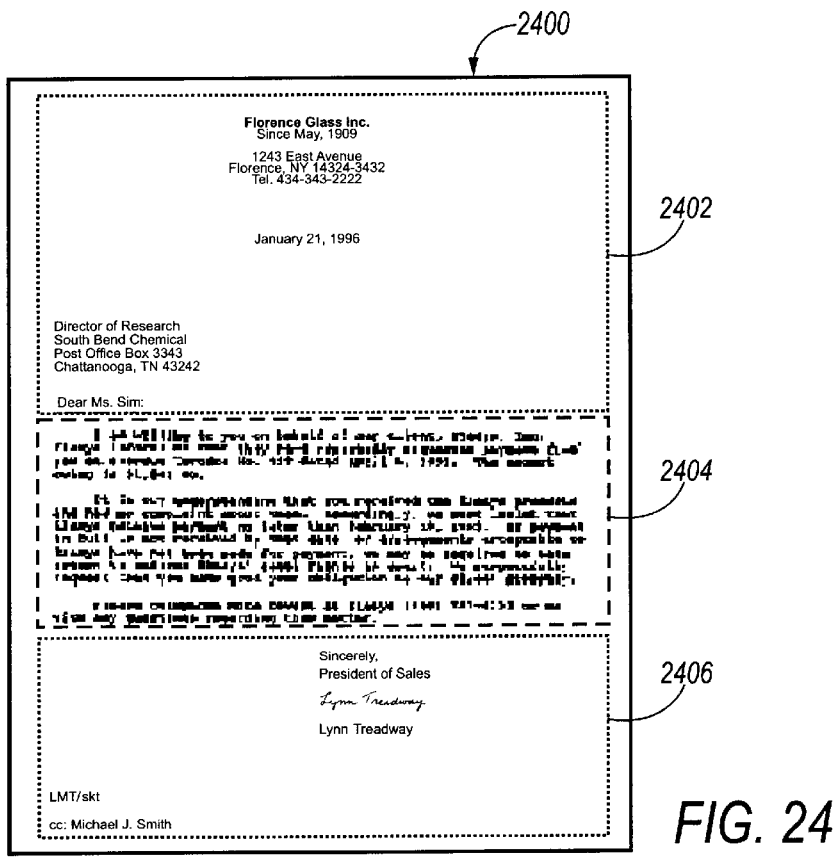
FIG. 24 illustrates a page image after completing the first stage where layout objects having a selected attribute are displayed at the first or high resolution and those layout objects which do not have the selected attribute are displayed at a second or low resolution.
Figure 25:
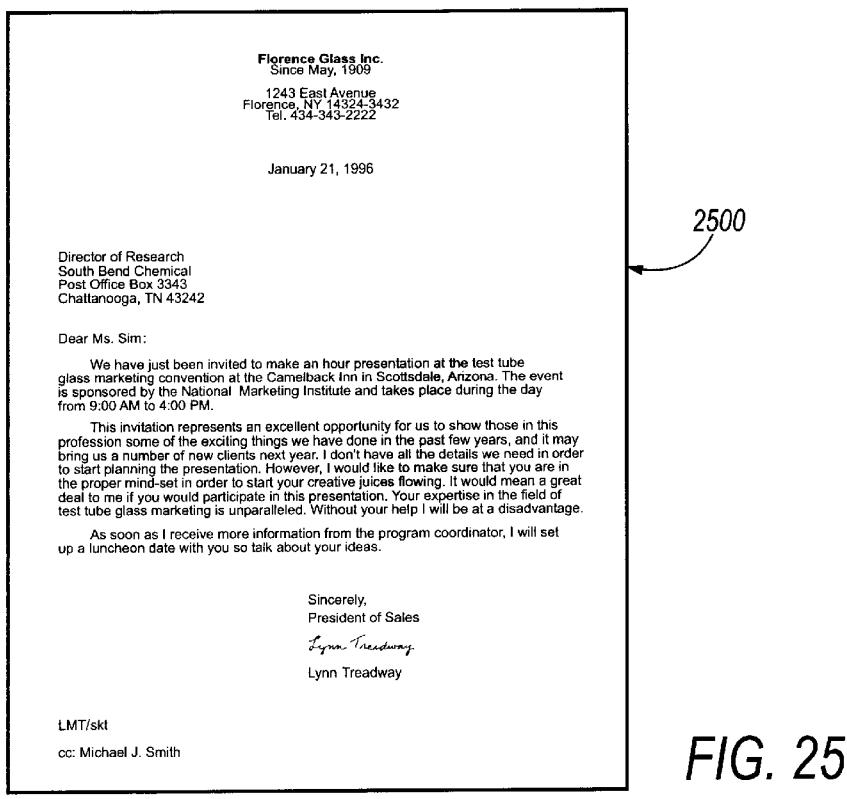
FIG. 25 illustrates the page images shown in FIGS. 22–24 after completing the second stage of display where the entire image is displayed at the first or high resolution.

FIGS. 22–24 illustrate three different examples of a page image after completing the first stage of progressive display but before beginning the second stage of progressive display. FIG. 25 illustrates the page images shown in FIGS. 22–24 after completing the second stage of display where the entire image 2500 is displayed at the first or high resolution. FIG. 22 illustrates an example page image 2200 where the features letter-date 2202, letter-recipient 2204, and letter-signature 2206 are displayed at the high or first resolution during the first stage. Other features in the page image 2200 are displayed at a lower resolution. FIG. 23 illustrates a page image 2300 where the same features 2202, 2204, and 2206 are displayed at the high or first resolution. However, unlike the page image 2200, the other features of the page image 2300 not displayed at the high resolution are displayed using bounding polygons.

Users operating search interface 218 over network 130 may be operating in a closed world of an intranet. Users in such a closed world may have a large number of user features defined. However, in the an open-ended world of the internet, features may not have been defined and a user may only be able to identify layout objects by their attributes. FIG. 24 illustrates page image 2400 where image attributes are used to identify layout objects to be transmitted at a first or high resolution unlike images 2200 and 2300 in FIGS. 22 and 23. In page image 2400, the first stage of transmission and/or display distinguishes between layout objects having the attribute of running text versus non-running text. More specifically, the image sections 2402 and 2406 illustrate layout objects with a TRUE non-running text attribute at the first or high resolution. In contrast, the image section 2404 illustrates layout objects with a FALSE running text attribute at the second or low resolution.

J. Conclusion

To recapitulate, the present invention concerns a technique for describing the layout structure of page images of a document image in terms of the spatial relations that blocks of text in a page image have to frames of reference that are defined by other text blocks. An advantage of this layout technique is that it does not rely on character recognition and therefore may be performed at relatively low resolution. A second advantage of this layout technique is that it provides a high-level framework suitable for interactive, user specification of new layout components and structures, thereby providing flexibility to identify documents by category and/or format. This second advantage is brought about because features can be defined and detected in document images using straight-line programs.

It will be understood by those skilled in the art that although the present invention has been explained using the first page of documents, the present invention applies to entire documents. In addition, although most of the discussion focuses on documents which originate from scanned document images, it will be appreciated by one skilled in the art, however, that the present invention can be applied to electronically derived documents that have a structure that is lost if only the text within the document is examined by a search and retrieval system. For example, an electronic document defined using PostScript may have a layout structure that varies depending on the particular decomposer used to render the PostScript document. An advantage, therefore, of the present invention is that it provides a method which can be used to explicitly define the high-level layout structure of a document, irrespective of whether the document format originated from a bitmap or a higher level PDL representation.

The document management system may be readily implemented in software using software development environments that provide portable source code that can be used on a variety of hardware platforms. Alternatively, the disclosed system may be implemented partially or fully in hardware using standard or custom logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for sorting document images stored in a memory of a document management system, comprising the steps of:

segmenting each document image recorded in the memory into a set of layout objects; each layout object in each of the sets of layout objects being one of a plurality of layout object types; each of the plurality of layout object types identifying a structural element of a document;

selecting a feature of a document from a set of features; each of the features in the set of features identifying groups of layout objects in different ones of the sets of layout objects recorded in the memory;

assembling in the memory a set of image segments; each image segment in the set of image segments identifying those layout objects of a document image stored in the memory that form the selected feature;

computing a distance measurement between a selected image segment and ones of the image segments in the assembled set of image segments; and sorting the assembled set of image segments into clusters in the memory with the computed distance measurements; each cluster defining a grouping of image segments that have similar layout objects forming the selected feature.

2. The method according to claim 1, wherein said selecting step selects a plurality of features from the set of features.

3. The method according to claim 1, further comprising the step of selecting a subset of document images recorded in the memory.

4. The method according to claim 3, wherein said assembling step assembles the set of image segments by identifying those layout objects of each document image in the selected subset of document images.

5. The method according to claim 1, further comprises the steps of:

selecting a first image segment from the set of image segment to define the selected image segment;

computing a distance measurement between the first image segment and image segments remaining in the set of image segments; and defining a first cluster with the first image segment and certain of the remaining image segments having a distance measurement that is within a threshold distance.

6. The method according to claim 1, further comprising the steps of:

selecting a document image from the memory;

assembling a single image segment to define the selected image segment by identifying those layout objects of the selected document image that form the selected feature;

computing a distance measurement between the single image segment and each image segment in the set of image segments; and forming clusters of document images by ranking the computed distance measurement between the single image segment and each image segment in the set of image segments.

7. The method according to claim 1, further comprising the step of displaying the assembled image segments in the clusters sorted by said sorting step.

8. The method according to claim 1, further comprising the step of computing attributes for each layout object in the set of layout objects; the computed attributes of each layout object having values that quantify properties of a structural element and identify spatial relationships with other segmented layout objects in the document image.

9. The method according to claim 8, further comprising the step of executing a routine for identifying a feature of the document image; the routine having a sequence of selection operations that consumes the set of layout objects and uses the computed attributes to produce a subset of layout objects; said executing step identifying the subset of layout objects as the feature of the document image.

10. The method according to claim 1, further comprising the step of defining a structural model for identifying a genre of document; wherein the structural model defines a class of document images which express a common communicative purpose that is independent of document content.

11. The method according to claim 1, further comprising the step of providing a user interface for selecting the feature.

12. The method according to claim 1, wherein said assembling step assembles more than one layout object to form the selected feature of a document image stored in the memory.

13. The method according to claim 1, further comprising the steps of:

specifying a set of features in addition to the selected feature;

wherein said sorting step assembles the set of image segments into clusters that include the selected feature and the specified set of features; and wherein the selected feature includes a subset of layout objects of ones of the specified set of features.

14. A program storage device readable by a machine, tangibly embodying a program of instructions executable by the machine to perform method steps for sorting document images stored in a memory of a document management system, said method steps comprising:

segmenting each document image recorded in the memory into a set of layout objects; each layout object in each of the sets of layout objects being one of a plurality of layout object types; each of the plurality of layout object types identifying a structural element of a document;

selecting a feature of a document from a set of features; each of the features in the set of features identifying groups of layout objects in different ones of the sets of layout objects recorded in the memory;

assembling in the memory a set of image segments; each image segment in the set of image segments identifying those layout objects of a document image stored in the memory that form the selected feature;

computing a distance measurement between a selected image segment and ones of the image segments in the assembled set of image segments; and sorting the assembled set of image segments into clusters in the memory with the computed distance measurements; each cluster defining a grouping of image segments that have similar layout objects forming the selected feature.

15. The program storage device as recited in claim 14, wherein said method steps further comprises the steps of:

selecting a first image segment from the set of image segment to define the selected image segment;

computing a distance measurement between the first image segment and image segments remaining in the set of image segments; and defining a first cluster with the first image segment and certain of the remaining image segments having a distance measurement that is within a threshold distance.

16. The program storage device as recited in claim 14, wherein said method steps further comprises the steps of:

selecting a document image from the memory;

assembling a single image segment to define the selected image segment by identifying those layout objects of the selected document image that form the selected feature;

computing a distance measurement between the single image segment and each image segment in the set of image segments; and forming clusters of document images by ranking the computed distance measurement between the single image segment and each image segment in the set of image segments.

17. The program storage device as recited in claim 14, wherein said method steps further comprise the step of:

specifying a set of features in addition to the selected feature;

wherein said sorting step assembles the set of image segments into clusters that include the selected feature and the specified set of features; and wherein the selected feature includes a subset of layout objects of ones of the specified set of features.

18. A document management system for sorting document images, comprising:

a memory for storing the document images and image processing instructions of the document management system; and a processor coupled to the memory for executing the image processing instructions of the document management system; the processor in executing the image processing instructions:

segmenting each document image recorded in the memory into a set of layout objects; each layout object in each of the sets of layout objects being one of a plurality of layout object types; each of the plurality of layout object types identifying a structural element of a document;

selecting a feature of a document from a set of features; each of the features in the set of features identifying groups of layout objects in different ones of the sets of layout objects recorded in the memory;

assembling in the memory a set of image segments; each image segment in the set of image segments identifying those layout objects of a document image stored in the memory that form the selected feature;

computing a distance measurement between a selected image segment and ones of the image segments in the assembled set of image segments; and sorting the assembled set of image segments into clusters in the memory with the computed distance measurements; each cluster defining a grouping of image segments that have similar layout objects forming the selected feature.

19. The document management system according to claim 18, further comprising a program interface for selecting the feature.

20. The document management system according to claim 18, wherein said program interface provides means for selecting a first feature and a second feature from the set of features.

21. The document management system according to claim 18, further comprising means for selecting a set of document images recorded in the memory.

22. The document management system according to claim 21, wherein said selecting assembles a set of image segments by identifying those layout objects of each document image in the selected set of document images.

23. The document management system according to claim 18, wherein the processor in executing the image processing instructions:

specifies a set of features in addition to the selected feature; and wherein said sorting image processing instruction assembles the set of image segments into clusters that include the selected feature and the specified set of features; and wherein the selected feature includes a subset of layout objects of ones of the specified set of features.

* * * * *